(12) United States Patent
Golparian

(10) Patent No.: US 10,190,409 B2
(45) Date of Patent: Jan. 29, 2019

(54) WELL COMMUNICATION SYSTEM

(71) Applicant: Schlumberger Technology Corporation, Sugar Land, TX (US)

(72) Inventor: Daniel Golparian, Sagamihara (JP)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 15/135,565

(22) Filed: Apr. 22, 2016

(65) Prior Publication Data

US 2017/0306754 A1  Oct. 26, 2017

(51) Int. Cl.
*E21B 47/12* (2012.01)
*G01V 11/00* (2006.01)

(52) U.S. Cl.
CPC ............ *E21B 47/123* (2013.01); *G01V 11/00* (2013.01)

(58) Field of Classification Search
CPC ... E21B 41/0085; E21B 17/028; E21B 47/123
USPC .................. 385/15; 285/48; 340/84.7
See application file for complete search history.

(56) References Cited

U.S. PATENT DOCUMENTS

| 4,589,285 A | * | 5/1986 | Savit | G01H 9/004 367/149 |
| 2004/0114463 A1 | * | 6/2004 | Berg | E21B 17/1021 367/14 |
| 2008/0291460 A1 | * | 11/2008 | Khatchaturov | G01D 5/35383 356/478 |
| 2016/0208603 A1 | * | 7/2016 | Barfoot | E21B 47/123 |
| 2016/0273335 A1 | * | 9/2016 | Quintero | G01V 5/101 |

\* cited by examiner

*Primary Examiner* — Fabricio R Murillo Garcia
(74) *Attorney, Agent, or Firm* — Eileen Pape

(57) ABSTRACT

A system that is usable with a well includes a telemetry network; a plurality of receivers that are arranged in groups; and a plurality of concentrators that are associated with the groups of receivers. A given concentrator is adapted to acquire data from an associated group of the receivers, and the concentrators communicate the data to an Earth surface of the well using a plurality of frequencies that are allocated among the concentrators.

15 Claims, 28 Drawing Sheets

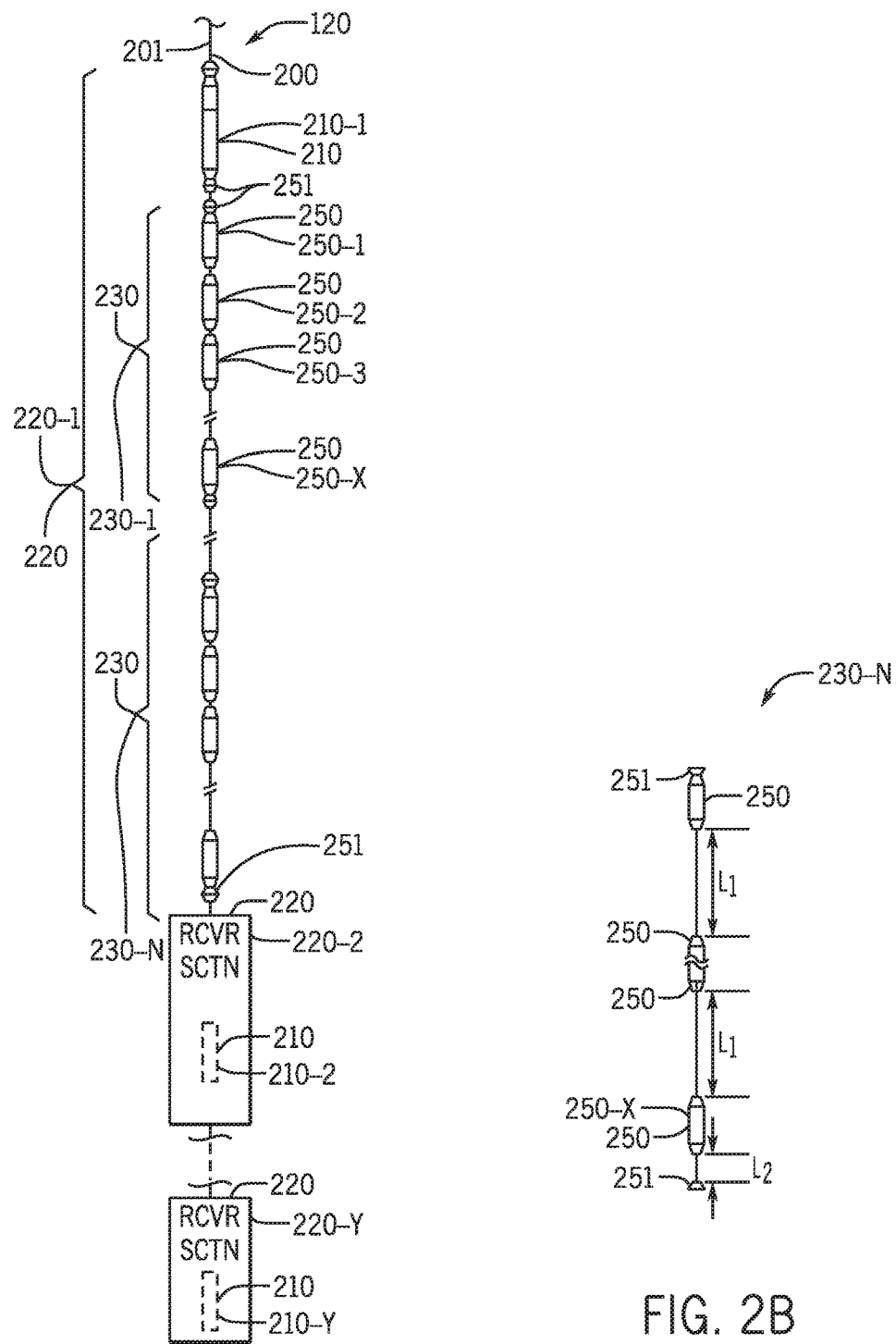
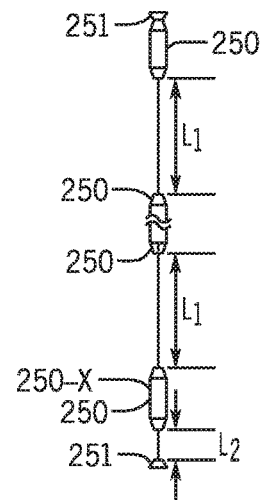
FIG. 2A
FIG. 2B

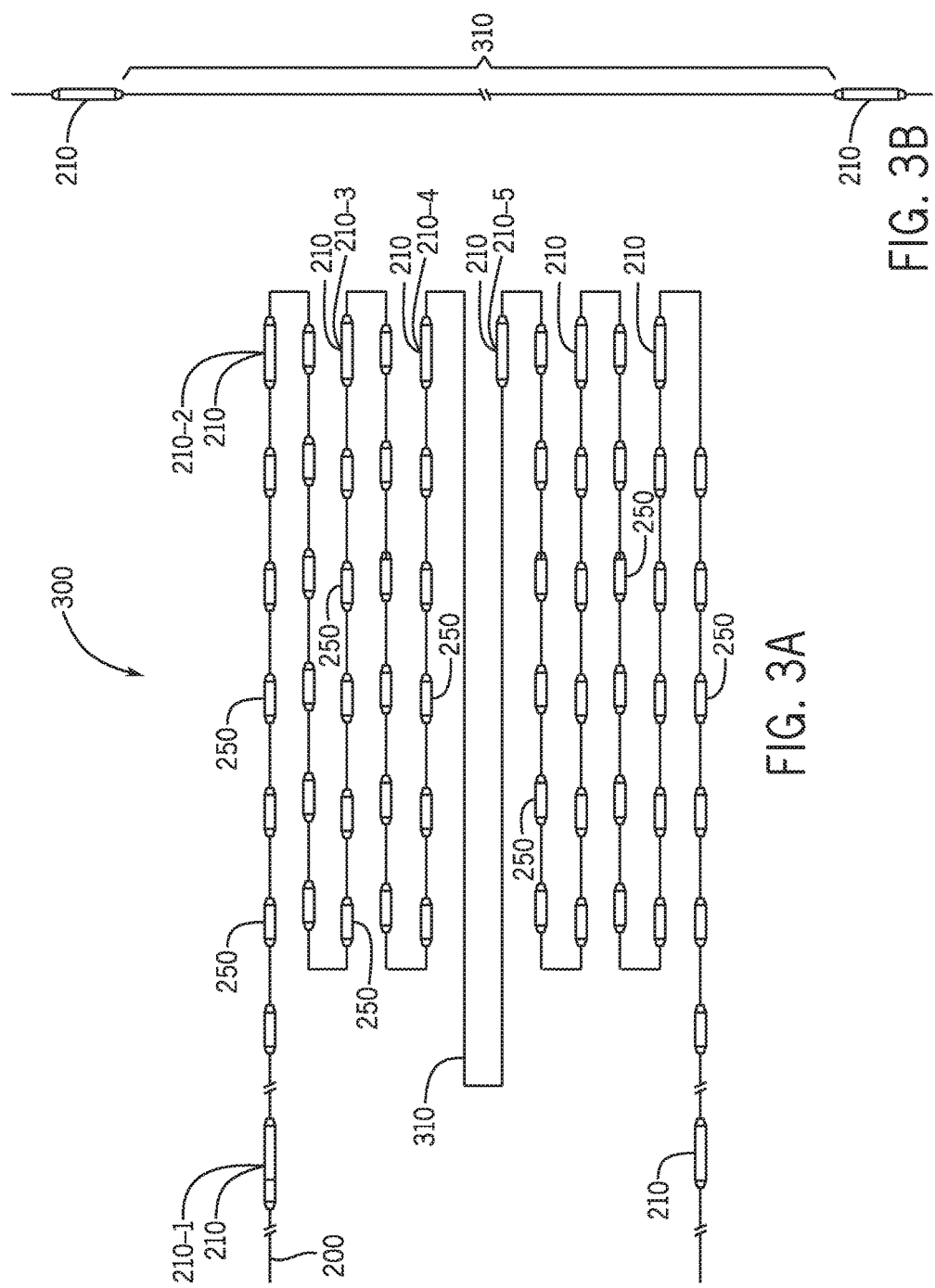

WELL COMMUNICATION SYSTEM

BACKGROUND

Downhole tools may be deployed in a wellbore that traverses a hydrocarbon bearing geologic structure for a variety of purposes; and these tools may communicate with the Earth surface via a telemetry system. For example, the tools may include sensors, or receivers, which acquire measurements of various well-related parameters. In this manner, pressure receivers, temperature receivers, strain receivers, seismic receivers, electromagnetic (EM) receivers, resistivity receivers and so forth may be deployed in the well for purposes of acquiring information about the environment inside the well, the properties of the geologic structure, conditions and parameters of downhole equipment, and so forth.

SUMMARY

In accordance with an example implementation, a technique that is usable with a well includes deploying tools in the well and using wave division multiplexing (WDM) channel-based communication to communicate with the tools.

In accordance with another example implementation, a system that is usable with a well includes a telemetry network; a plurality of receivers that are arranged in groups; and a plurality of concentrators that are associated with the groups of receivers. A given concentrator is adapted to acquire data from an associated group of the receivers, and the concentrators communicate the data to an Earth surface of the well using a plurality of frequencies that are allocated among the concentrators.

In accordance with yet another example implementation, an apparatus that is usable with a well includes a concentrator that is adapted to be deployed downhole in the well and acquire data from an associated group of tools that are coupled by a non-optical network and introduce the data to an optical telemetry network at a node of the optical telemetry network. The concentrator includes at least one optical filter and a transceiver. The optical filter(s) selectively add or drop a wavelength division multiplexing (WDM) channel to or from the optical telemetry network. The transceiver communicates between the non-optical and optical telemetry networks.

Advantages and other desired features will become apparent from the following drawings, description and claims.

BRIEF DESCRIPTION OF THE DRAWINGS

FIG. 2A is a schematic diagram of a scalable borehole acquisition system according to an example implementation.

FIG. 2B is a schematic diagram illustrating receiver-to-receiver spacing and receiver-to-concentrator spacing for the scalable borehole acquisition system according to an example implementation.

FIGS. 3A and 3B are schematic diagrams of a section of the scalable borehole acquisition system illustrating a designed gap between adjacent concentrators of the system according to an example implementation.

DETAILED DESCRIPTION

Figure 1A:
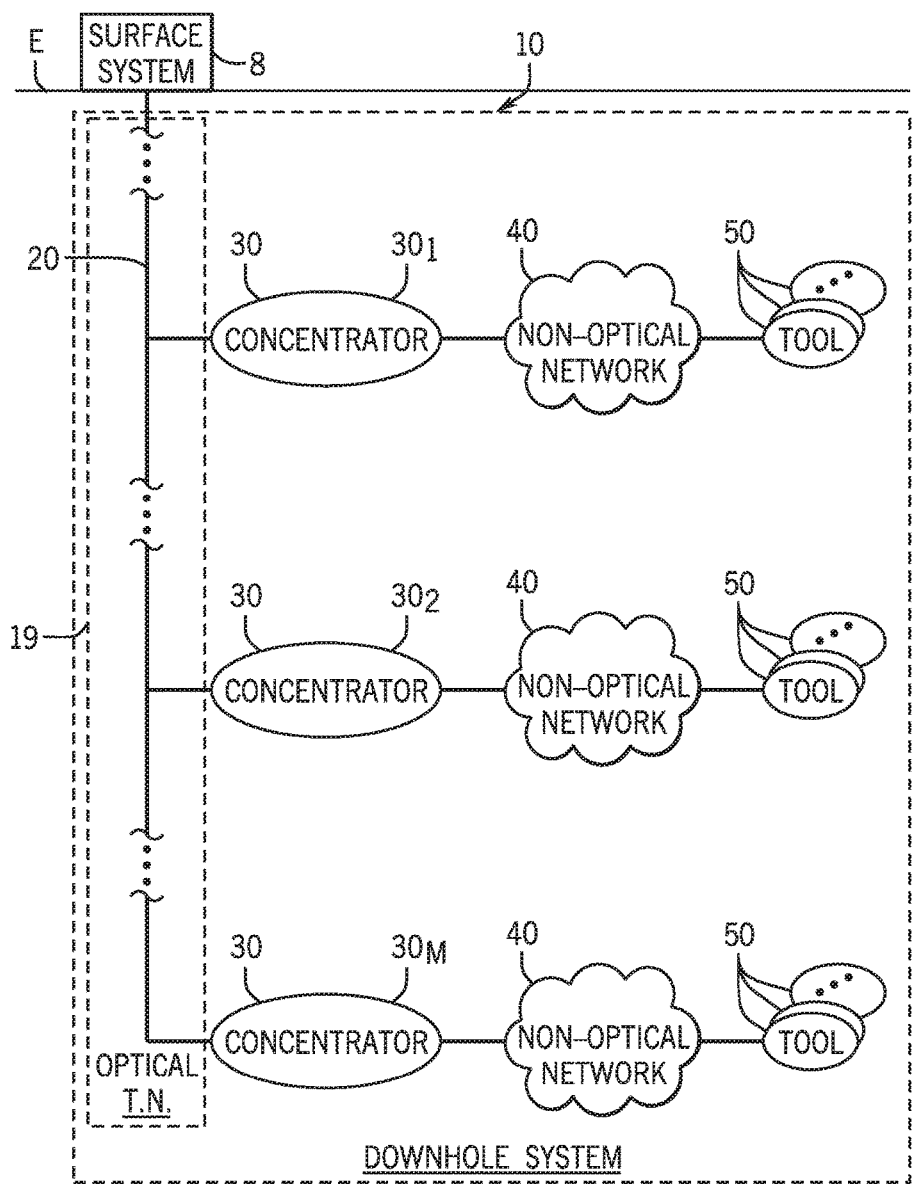
FIG. 1A is a schematic diagram of surface and downhole systems for a well according to an example implementation.

Systems and techniques are described herein for purposes of communicating data to and from downhole well tools over an optical fiber-based telemetry network (also called an "optical telemetry network" herein). In general, the downhole tools may be dedicated receivers, or sensors, or may be other tools (a multipurpose measurement tool, a valve assembly, a packer, a performing gun assembly and so forth) that contain receivers for purposes of acquiring data that is transmitted as uplink data to the Earth surface via the optical fiber-based telemetry network. As an example, the uplink data may be measurement data that represents various parameters about the environment inside the well, the properties of a geologic structure, conditions and parameters of downhole equipment, and so forth. Moreover, the tools may contain a mixture of different receivers for purposes of acquiring data representing a wide variety of measured well-related parameters.

The downhole tools may receive downlink data via the optical fiber-based telemetry network. As an example, the downlink data may be command data representing commands for the downhole tools. As examples, the commands may include a command to begin a data acquisition, a command to halt or end a data acquisition, a command to instruct a tool to begin communicating acquired data uphole, a command to query a tool about the tool's current state, and so forth.

Due to a potentially large number of downhole receivers in a given well and the correspondingly potentially large amount of data acquired by the receivers, an optical fiber-based telemetry network is used, as the network has a potentially relatively high bandwidth for purposes of communicating the data to the Earth surface of the well. However, due to such constraints as cost and downhole size restrictions, the tools may be locally coupled to non-optical networks, which are relatively slower and have relatively smaller bandwidths, as compared to the speed and bandwidth of the optical telemetry network. Moreover, the tools may be pooled, or grouped together, downhole, such that a given segment of the well may contain a group of tools that are coupled to a non-optical network for purposes of transmitting (ultimately to the Earth surface of the well) and receiving data from the Earth surface.

As described herein, for purposes of communicating the uplink and downlink data between the tools and the Earth surface, devices called "concentrators" are deployed in the well. Each concentrator has an optical network interface; forms a node on the optical telemetry network; is associated with a group of one or more well tools; and collects, or aggregates, data for the associated group of tools. In general, a given concentrator communicates downlink data (command data, for example) received over the optical telemetry network to the non-optical network associated with the concentrator's associated tool(s), and communicates uplink data (data acquired by the concentrator's associated tool(s), for example) to the optical telemetry network. Moreover, as described herein, wave division multiplexing (WDM) is used for communications on the optical telemetry network for purposes of maintaining relatively low frequencies of operation for downhole equipment (which is favorable due to the downhole temperatures) and using relatively few optical fibers (one fiber or two fibers for redundancy, as described herein) for the communication.

Referring to FIG. 1A, as a more specific example, a downhole system 10 may be run, or deployed, in a well; and as part of its function, the system 10 may communicate downlink data, such as downhole measurement data (or "acquired data") and uplink data, such as data representing commands (or "command data") with a surface system 8. The downhole system 10, in accordance with example implementations, is deployed on a single cable 20 that extends into a wellbore (a lateral, vertical or deviated wellbore) of the well. The cable 20 contains various components, such as one or multiple optical fibers and possible optical repeaters that form an optical telemetry backbone, called an "optical telemetry network 19". The cable 20 has downhole tools 50 and contains concentrators 30 (M concentrators 30, being depicted as examples in FIG. 1A) that form respective nodes of the optical telemetry network 19. In general, the concentrators 30 are spatially distributed along the cable 20 at different depths (or distances from a wellbore heel for lateral bores), such that each concentrator 30 is disposed in the vicinity of an associated group of one or more of the downhole tools 50.

A given concentrator 30 communicates downlink (command data, for example) and uplink data (acquired measurement data, for example) from/to the optical telemetry network 19 for its associated tool group. In this regard, the tool(s) 50 of a given group are coupled to and communicate with the associated concentrator 30 and potentially with each other using an associated non-optical network 40, as depicted in FIG. 1A. As an example, the non-optical network 40 may be formed from twisted pairs of copper wires that communicate electrical signals, in accordance with some implementations; and as can be appreciated by one of ordinary skill in the art, the non-optical network 40 may have significantly less bandwidth and be significantly slower for data communication purposes, as compared to the optical telemetry network 19. A given concentrator 30 effectively forms a communication bridge for the associated group of tool(s) 50 between the corresponding telemetry network 40 and a corresponding node of the optical telemetry network 19.

A given tool 50 may be a dedicated sensor, or receiver; or a given tool 50 may be a tool that performs one or more non-measurement functions and include one or more of a variety of different sensors, or receivers, depending on the particular implementation. For example, the tools 50 may include such sensors, or receivers, as pressure receivers, temperature receivers; strain receivers; resistivity receivers; fluid samplers; formation samplers; nuclear magnetic resonance (NMR) receivers; electromagnetic (EM) receivers; particle motion receivers; or geophones; pressure sensors or hydrophones; a microelectromechanical system (MEMS)-based sensor; a combination of one or more of any of these sensors; and so forth. Moreover a given tool group may be formed from tools 50 that measure the same parameter type; and another tool group may be formed from tools 50 that measure another parameter type. In further example implementations, the tools 50 may generally be the same, such as the case for a seismic borehole acquisition system in which the tools 50 are multi-component seismic receivers, as described in example implementations below.

One way to communicate a relatively large volume of data over the optical telemetry network 19 is for the optical network interfaces of the concentrators 30 to operate at relatively high frequencies. However, in the downhole environment, the permissible margin between the ambient temperature and the operating temperature of downhole electronics may be relatively small. Because high frequencies usually mean high operating temperatures, it may be challenging to reliably operate electronics of the optical network interfaces at such high frequencies. In accordance with example systems and techniques that are disclosed herein, instead of operating at such high frequencies, the optical network interfaces of the concentrators are assigned different optical carrier wavelengths (i.e., assigned different optical carrier frequencies) for purposes of creating and using wavelength division multiplexing (WDM) communication channels on the optical telemetry network 19. Because the WDM channels are divided among the concentrators 30, the optical network interfaces of the concentrators 30 may operate at relatively lower frequencies.

In accordance with example implementations, each concentrator 30 is assigned two WDM channels: a first WDM channel, or carrier wavelength, for communicating downlink data, such as command data, which originates with the surface system 8; and a second WDM channel, or carrier wavelength, for communicating acquired data originating with downhole tools 50 to the surface system 8. Thus, in accordance with example implementations, each concentrator 30 is assigned a different pair of WDM channels, and the concentrator 30 modulates its assigned carrier wavelength with the uplink data for purposes of communicating the uplink data to the surface system 8; and the concentrator 30 demodulates optical energy received from its other assigned WDM channel for purposes of receiving downlink data, such as command data, from the surface system 8. It is noted that in accordance with some example implementations, a given concentrator 30 may be assigned to a single WDM channel (rather than two WDM channels) for purposes of either uplink or downlink communication, depending on the particular application. In further example implementations, a given concentrator 30 may be assigned to more than two WDM channels. Thus, many implementations are contemplated, which are within the scope of the appended claims.

Figure 1B:
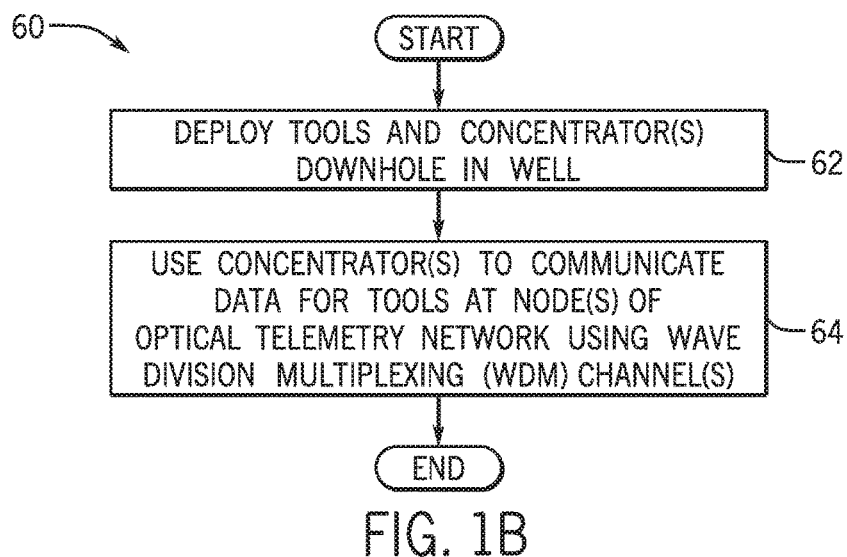
FIGS. 1B and 1C are flow diagrams depicting techniques to use at least one concentrator and wave division multiplexing (WDM) channels of an optical telemetry network to communicate data for downhole tools according to example implementations.
Figure 1C:
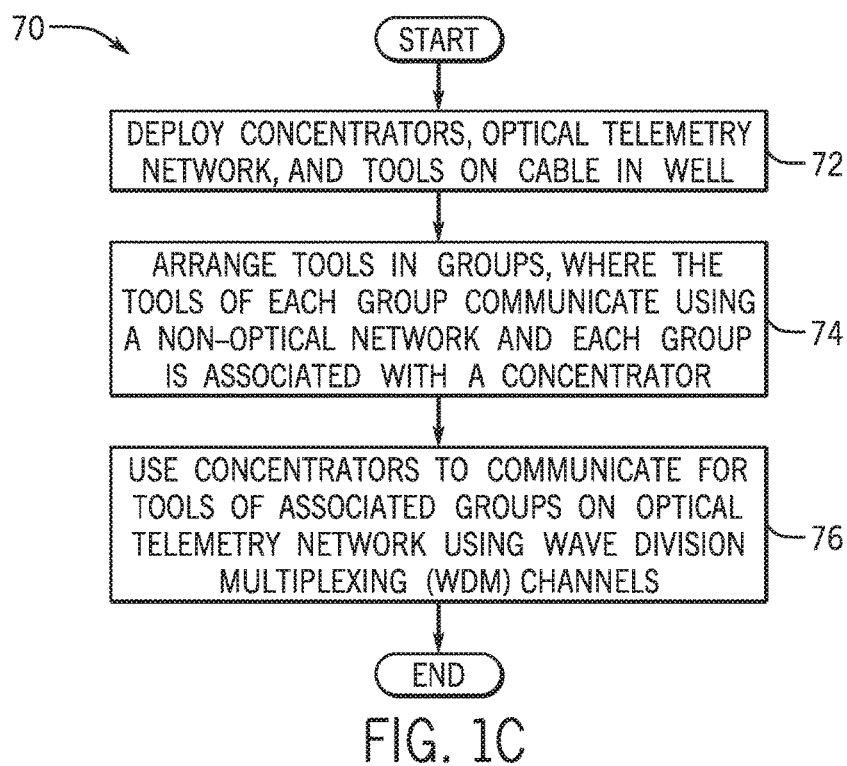

Thus, referring to FIG. 1B, in accordance with example implementations, a technique 60 includes deploying (block 62) tools and at least one concentrator downhole in a well and using the concentrator(s) to communicate data for the tools using wave division multiplexing (WDM) channels of an optical telemetry network, pursuant to block 64. More specifically, referring to FIG. 1C, in accordance with example implementations, a technique 70 includes deploying (block 72) concentrators, an optical telemetry network and tools on a cable in a well, pursuant to block 72; and arranging (block 74) the tools in groups, where the tools of each group communicate using a non-optical network, and each group is associated with a concentrator. Pursuant to the technique 70, the concentrators are used (block 76) to communicate for tools of associated groups on the optical telemetry network using wave division multiplexing (WDM) channels.

As a more specific example, in accordance with some implementations, the downhole system 10 of FIG. 1A may be part of a cable-based seismic acquisition system (called a "scalable borehole acquisition system" herein) in which the tools 50 are seismic receivers. As its name implies, the scalable borehole seismic acquisition system is constructed to allow seismic receivers to be relatively easily add or removed for purposes of adapting the system for a given downhole application. The scalable borehole seismic acquisition system may contain hundreds, if not thousands, of seismic receivers (or sensors), such as hydrophones and accelerometers. The deployed receivers may be advantageously used for seismic acquisitions, such as vertical seismic profile (VSP)-based acquisitions, that use active seismic sources, as well as passive seismic acquisitions, such as microseismic acquisitions that do not. As described herein, the scalable borehole acquisition system may have one or more of the following features that permit the use of a relatively large number of receivers, the customized scaling of the number of receivers for a given application, and the customized spatial distribution of the receivers for a given application: connectable cable-based receiver cable sections; stackable cable-based receiver sections; microelectromechanical system (MEMS) receivers; a high speed telemetry network; and data concentrators to gather acquired data from the receivers for the high speed telemetry network.

The global increase in demand for energy resources and the increasing difficulty of expanding exploration into frontier areas leaves oil and gas exploration and production companies facing the ever-challenging task of extracting more hydrocarbons from existing reservoirs. The scalable borehole acquisition system that is disclosed herein may be used, as an example, to perform a VSP-based acquisition to address and maximize production productivity through the use of VSP-based acquisitions. VSP-based acquisitions provide insight into complex reservoirs, and may improve vertical resolution of acquired seismic data around a well. Moreover, a VSP-based acquisition may provide relatively high-resolution seismic images in the near regions surrounding the borehole.

In general, in a VSP-based acquisition, both the downgoing and the up-going seismic waves pass by borehole-disposed multicomponent receivers. The seismic waves may be attributable to energy produced by at least one surface seismic source, such as a vibrator in the case of a land-based acquisition, or an air gun, in the case of a marine acquisition. The borehole receivers are part of an array of multicomponent downhole receivers that are deployed in the borehole.

The data recorded by the array of receivers is communicated through a telemetry system to a "surface" of the well. In this context, the surface may be the Earth surface for a land-based well platform, a ship or in general, a region outside of the well. The data communicated to the surface may be further processed for purposes of imaging and other seismic processing applications that are generally directed to information about the surveyed geologic structure. The ability to record the downgoing wavefield at each receiver location in the borehole in a VSP-based acquisition is advantageous over conventional surface seismic recording techniques. In this manner, the information that is extracted from the downgoing waves may be used to enhance the final product of the upgoing wavefield VSP section. Because the scalable seismic borehole system that is disclosed herein allows the receivers to be relatively closely spaced through the area of interest in the borehole, a finely tuned image of the subsurface in the final VSP product may be obtained.

The scalable borehole acquisition system that is disclosed herein may also be used in a microseismic acquisition. As noted above, a microseismic acquisition does not use an active seismic source. For example, one type of microseismic data acquisition involves monitoring hydraulic fracturing (for such purposes as estimating a fracture network or fracture volume, as examples). In this manner, an array of receivers residing in a monitoring borehole records microseismic events or acoustic emissions that are attributable to the hydraulic fracturing in a treatment well. Data acquired by the array of receivers may be continuously communicated to a surface system through a telemetry system, and subsequent data processing may then determine microseismic event locations and their associated magnitudes.

Due to the relatively large number of receivers that may be deployed using the techniques and systems that are disclosed herein, the scalable borehole acquisition system may have a number of advantages. First, the scalable borehole seismic system may acquire a relatively denser spatial sampling for a given aperture (the length of the array of receivers). A relatively dense spatial sampling, in turn, enhances the cancellation of noise and generally improves the quality of the acquired data. Another advantage pertains to the decreased deployment and logistic costs. More specifically, when covering a certain depth with a relatively longer array, the number of "shots" per location tends to decrease. Because each shot with a source (for example, a surface-based vibrator) at each location is repeated every time the receiver array moves, a long receiver array directly translates to a decreased deployment cost. Other and different advantages may be achieved, in accordance with further implementations.

Figure 1D:
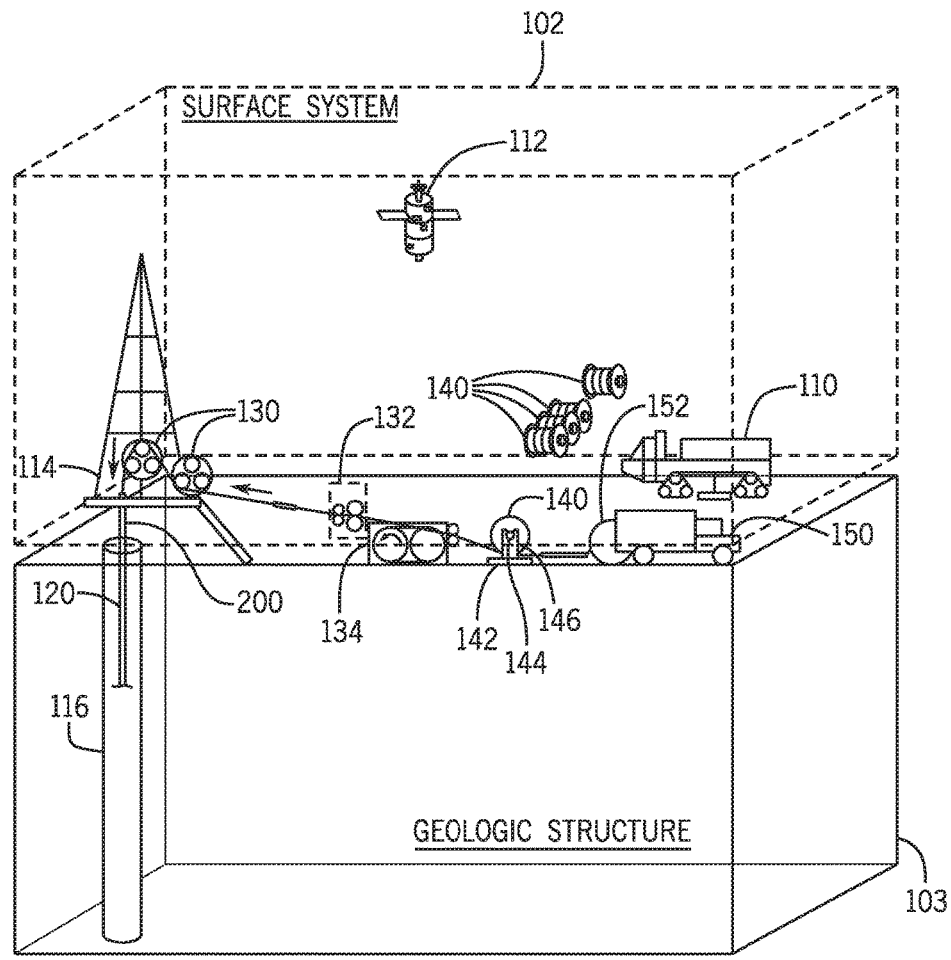
FIG. 1D is a schematic diagram of a seismic acquisition system according to an example implementation.

As a more specific example, FIG. 1D depicts a surface system 102 that may be used to deploy and use a scalable borehole acquisition system 120 for purposes of acquiring information about a geologic structure 103. The scalable borehole acquisition system 120, in general, is used to deploy the scalable borehole acquisition system 120 in the well and retrieve the system 120 from the well at the end of the acquisition. The surface system 102 is further used to communicate commands and receiver data with the downhole scalable borehole system 120 and position the system 120 during the acquisition, as described herein. It is noted that although the systems and techniques that are disclosed herein are described in connection with a land-based well, the systems and techniques may likewise be applied to subsea wells, in accordance with further, example implementations. Moreover, the systems and techniques that are disclosed herein may be applied to deviated wellbores, in addition to the vertical wellbores that are illustrated in the figures.

Referring to FIG. 2A in conjunction with FIG. 1D, in accordance with example implementations, the scalable borehole acquisition system 120 is deployed on a cable 200 and includes downhole, "intermediate communication units" which are called "data concentrators," or "concentrators" herein. In FIG. 2A, the concentrators are assigned reference numeral "210." The scalable borehole acquisition system 120 for this example includes a Y number of concentrators 210 (concentrators 210-1, 210-2 and 210-Y, being specifically depicted in FIG. 2A). As described in more detail herein, the concentrators 210 gather receiver data from associated downhole receivers 250; distribute commands to the associated downhole receivers 250; and serve as nodes on a relatively high speed telemetry network (an optical fiber-based network, for example) that extends (via an upper part 201 of the cable 200) to the surface for purposes of communicating commands and acquired data with the surface system 102.

In accordance with example implementations, the scalable borehole seismic system 120 contains Y receiver sections 220 (example receiver sections 220-1, 220-2 and 220-Y, being depicted as examples in FIG. 2A), which are disposed on corresponding cable segments that are serially connected together in an end-to-end fashion, as depicted in FIG. 2A. In general, each receiver section 220 contains multiple seismic receivers 250 and an associated concentrator 210 at its upper end (for this example).

As further described herein, in accordance with example implementations, the receiver 250 may be a multicomponent receiver that contains multiple seismic sensing elements. For example, according to example implementations, the receiver 250 may sense three orthogonal components of particle motion as well as pressure.

The seismic receivers 250 of a given receiver section 220 do not communicate with the associated concentrator 210 using the high speed telemetry network; but rather, the receivers 250 and concentrator 210 of a given receiver section 220 are nodes of a relatively slower telemetry network. For example, the receivers 250 of a given receiver section 220 may communicate, for example, using twisted copper wire pairs, in accordance with example implementations. It is noted that the concentrator 210 is running at a relatively higher clock frequency, as compared to the clock frequency of the receiver 250, in accordance with example implementations, as the concentrator 210 is also a node of the high speed telemetry network.

In accordance with example implementations, the cable 200 has metallic conductor lines (copper lines) and one or more optical fibers. In this regard, the cable 200 is a "hybrid" cable and includes, along at least part of its length, communication paths (copper wires, for example) that are used by the lower speed telemetry network and one or more communication paths (optical fibers, for example) that are used by the high speed telemetry network. Moreover, as further disclosed herein, the cable 200 contains one or more additional metallic conductor lines (copper wires, for example) for purposes of delivering power downhole to the power consuming components of the scalable borehole acquisition system 120, such as the concentrators 210 and receivers 250.

In accordance with example implementations, each seismic receiver section 220 includes N seismic receiver subsections 230 (example subsections 230-1 and 230-N, being depicted as examples in FIG. 2A). In this manner, a given receiver subsection 230 may be coupled to other subsection(s) 230 via corresponding cable connectors 251. In accordance with example implementations, each receiver subsection 230 may be a pre-manufactured collection of an X number of seismic receivers 250 that are connected to each other end-to-end during fabrication. In accordance with example implementations, a given receiver subsection 230 has two connectors 251: one connector 251 at its upper end and another connector 251 at its lower end.

The receiver subsections 230 in the scalable borehole acquisition system 120 may provide one or more of the following benefits. The receiver subsections 230 may significantly reduce the labor costs and time associated with deploying the system 120 (having hundreds if not thousands of the receivers 250). In this manner, having the receiver subsections 230 makes it unnecessary to otherwise connect the receivers 250 one-by-one as the system is deployed into the wellbore 116. Moreover, the use of the receiver subsections 230 decreases the total cost of the system. In this manner, because the cable 200 of the scalable borehole seismic system 120 is a hybrid cable containing optical fiber(s) and metallic conductors, the use of the receiver subsections 230 eliminates the need for having expensive hybrid connectors for each single receiver, as a hybrid connector is used for a group of multiple receivers 250. Moreover, reducing the number of hybrid connectors may be advantageous because such connectors may be potential sources of malfunction; and as such, reducing the number of hybrid connectors may significantly increase the reliability of the system.

The cable segment 201 above the top concentrator 210-1 may have a relatively long length (a length of several kilometers, for example) for purposes of coupling the downhole array of seismic receivers 250 to the surface system 102. For this purpose, this upper cable segment 201 contains one or more optical fibers for the fiber optic backbone, as well as wires (copper wires, for example) for distributing power to the power consuming components of the system 120. Unlike the cable below it, the upper cable segment 201 does not, however, contain copper wires (twisted pairs, for example) for purposes of transmitting data, in accordance with example implementations.

In accordance with example implementations, the top concentrator 210-1 may include additional features that are not part of the other concentrators 210. In this regard, in accordance with some implementations, the top concentrator 210-1 may include such features as a Gamma ray detector and power supply/conversion circuitry for distributing power received from the surface to the remainder of the system 120 below the top concentrator 210-1. Moreover, the top concentrator 210-1 may include a logging head. In this manner, the logging head may include such sensors as force and temperature sensors, which allow measurement of the tension of the cable 200 and the temperature of the mud. The top concentrator 210-1 may further include a telemetry cartridge that exchanges data and commands with the surface system 102, in accordance with example implementations.

Referring to FIG. 2B in conjunction with FIG. 2A, in accordance with example implementations, the receivers 250 are generally spaced apart by a length (called "$L_1$" in FIG. 2A). For purposes of evenly distributing the receivers 250, a distance (called "$L_2$" in FIG. 2B) between the receivers 250-X and its connector 251 for connecting the receiver 250-X to the next concentrator 210 is different: $L_2$=D—ConcentratorLength)/2. $L_1$ likewise a mating connector 251 to the concentrator 210 has the same $L_2$ spacing. This way, two seismic receivers 250 with a concentrator 210 in between still have a distance equal to $L_1$. If the length of the connectors is not negligible, this length is also taken into consideration to provide an array of evenly distributed seismic receivers 250.

It is noted that the a given receiver subsection 230 has a concentrator 210 and several receivers 250; and the lowest receiver 250 is connected to the concentrator 210 below it. After that, a predefined number of receiver subsections 230 are connected to each other, one after the other. When the last receiver subsection 230 in the top of the section 220 is connected, in the deployment of the scalable borehole acquisition system 120 into the well, the cable segment 201 with corresponding connectors 251 is used to make the final connection to the top concentrator 210-1.

In accordance with example implementations, the scalable borehole acquisition system 120 may allow a "flexible" array configuration to be customized to the specific application. For example, for some applications, geophysicists may desire a collection of receivers 250 (i.e. "sections" 230 of receivers) at one given depth and then a relatively long distance "gap" in between without any receivers 250, and another group of receiver sections 230, etc. The array customization is feasible due to the relatively high data rates with the concentrators 210 through the fiber optic backbone.

Referring to FIGS. 3A and 3B, in accordance with example implementations, an example section 300 of the system 120 illustrating this spacing includes receiver sections 230 and an intentionally-designed gap 310 between certain receiver sections 230. Thus, as depicted in FIG. 3B, a particular section of the system may include the corresponding gap 310 between adjacent concentrators 210.

Figure 4:
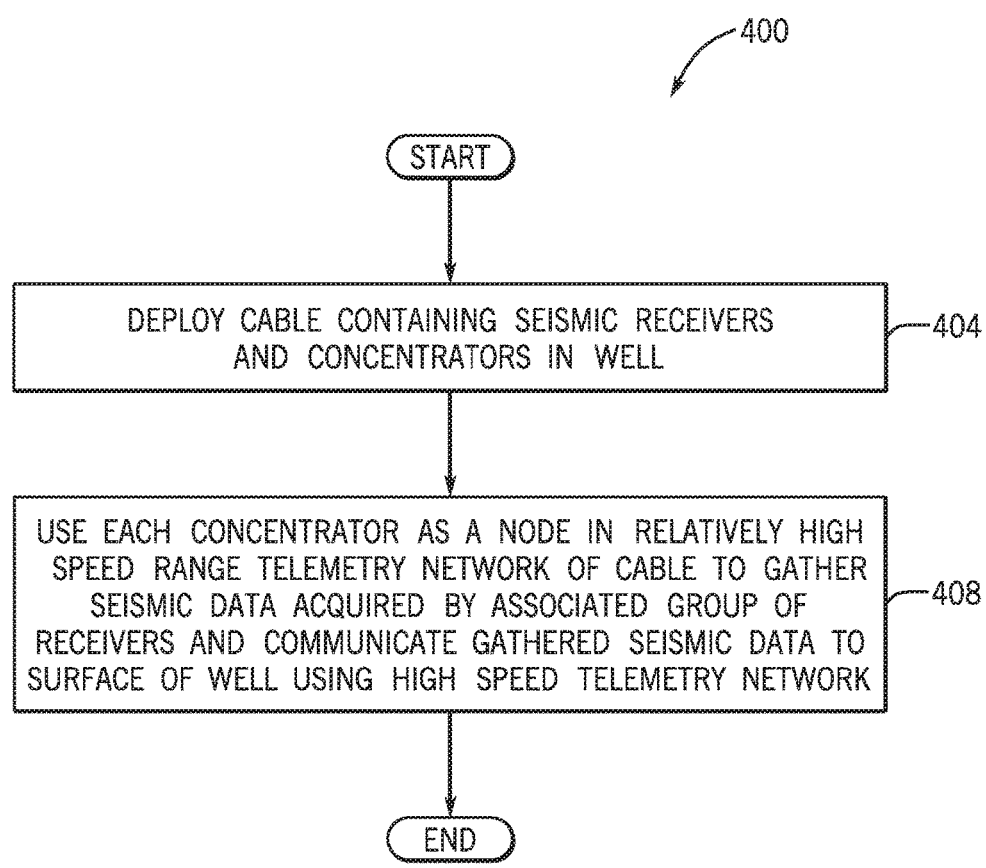
FIG. 4 is a flow diagram depicting a technique to deploy and use a scalable borehole acquisition system according to an example implementation.

Referring to FIG. 4, to summarize, in accordance with example implementations, a technique 400 includes deploying (block 404) a cable containing seismic receivers and concentrators in a well. Pursuant to the technique 400, each concentrator is used (block 408) as a node in a relatively high speed telemetry network to gather seismic data acquired by an associated group of receivers and communicate the gathered seismic data to the surface of the well using high speed telemetry network.

Figure 5:
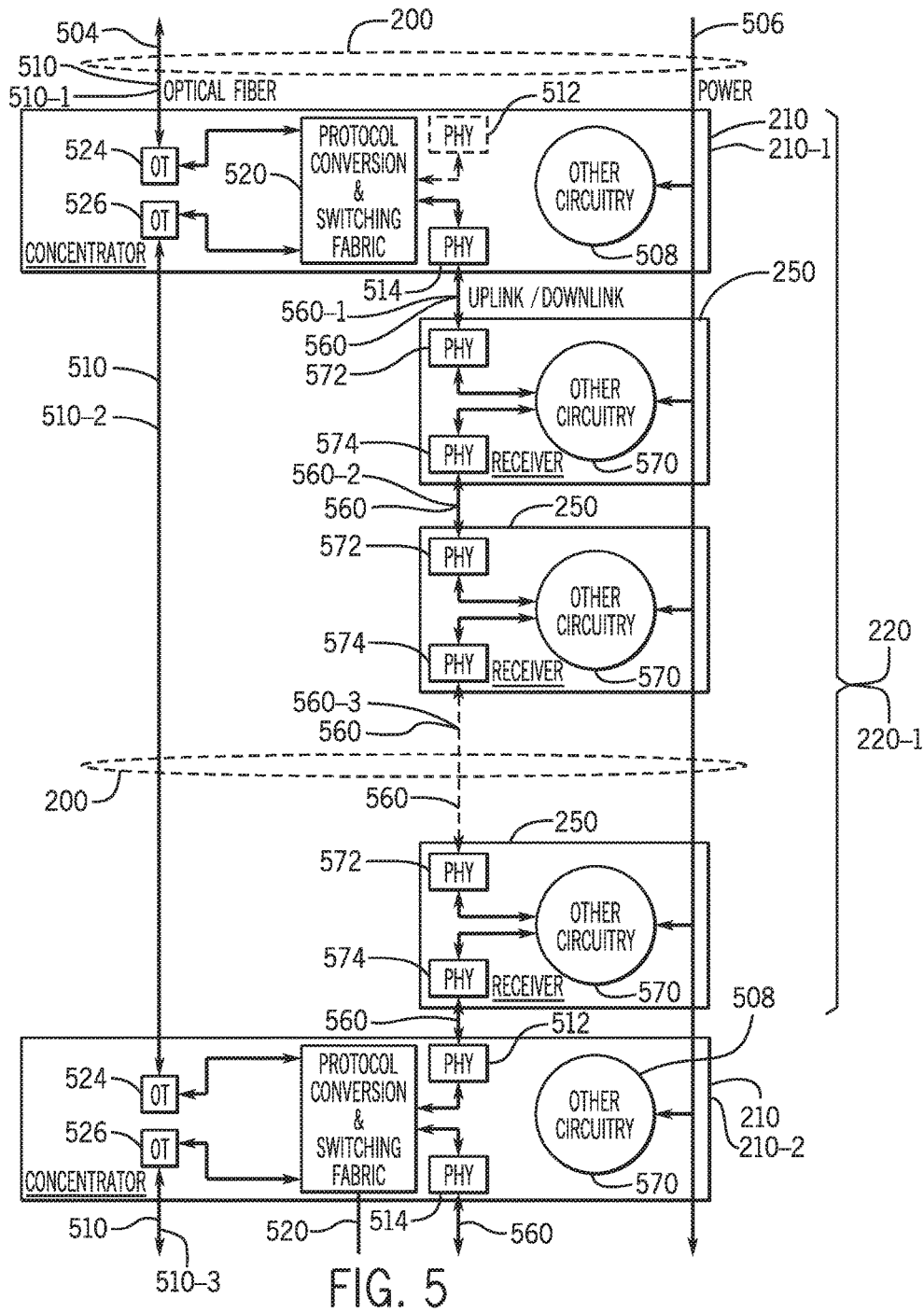
FIGS. 5 and 6A are schematic diagrams illustrating seismic receiver and concentrator circuitry for an example receiver section of the scalable borehole acquisition system according to example implementations.

Referring to FIG. 5, in accordance with example implementations, the seismic receivers 250 for a given section 220 (such as example section 220-1, which is depicted in FIG. 5) communicate using a relatively lower speed, copper-based communication protocol. A lower speed copper based communication protocol is used for communication with the receivers 250 on each receiver section 220. In this manner, in accordance with example implementations, twisted copper wire pairs 560 (example twisted pairs 560-1, 560-2 and 560-3, being shown in FIG. 5) of a given receiver section connect to physical network interfaces 572 and 574 of the various seismic receivers 250 for purposes of implementing layer one of the Open Systems Interconnection (OSI) model layers in a point-to-point fashion.

Each physical interface 572, 574 includes two "links": an "uplink" for delivering the measurement and status data to the surface system 102 (see FIG. 1); and a "downlink" for delivering command and synchronization data from the surface system 102 to the receivers 250. It is noted that in accordance with other example implementations, the seismic receivers 250 may be connected in a point-to-point fashion using wiring other than twisted copper pairs. Moreover, although specific low speed telemetry protocols are described herein, any of a number of protocols may be used, depending on the particular implementation, as can be appreciated by one of ordinary skill in the art.

Thus, as shown in FIG. 5, in general, each seismic receiver 250 includes two physical interfaces 572 and 574, as well as "other" circuitry 570, further described herein. Moreover, as depicted in FIG. 5, for purposes of communicating over the lower speed telemetry network used by the seismic receivers 250, the concentrator 210 includes physical interfaces 512 and 514. It is noted that each concentrator 210 includes two physical interfaces for communicating with receivers 250, thereby allowing a given concentrator 210 to either gather data from a group of seismic receivers 250 disposed uphole of the concentrator 210, or, alternatively, a group of seismic receivers 250 disposed downhole of the concentrator 210. This arrangement allows seismic data to be accumulated, or gathered, from either the group of seismic receivers 250 uphole or downhole to a given concentrator 210, which may be advantageous in the event of equipment failure (failure of a particular concentrator 210, for example).

Contrary to the communication used between the concentrator 210 and its associated group of receivers 250, the concentrators 210 (example concentrators 210-1 and 210-2 being depicted in FIG. 5) communicate with each other and with the surface using a relatively high speed communication protocol. For the example of FIG. 5, concentrators 210-1 and 210-2 communicate over an optical fiber-based network. In this regard, each concentrator 210 contains optical transceivers (OTs) 524 and 526 that are coupled to corresponding fiber optic segments 510 (example segments 510-1, 510-2 and 510-3 being depicted in FIG. 5) of the cable 200 for purposes of either communicating data uphole or downhole. This forms the "fiber optic backbone" and exchanges the accumulated data from the sections between concentrators. It also includes and uplink and a downlink. It is noted that the optical fibers only "pass through" the seismic receivers 250 and, in accordance with example implementations, do not have any interaction with the circuitry included therein.

In accordance with example implementations, the OTs 524 and 526 may communicate over the optical fiber-based network using two wave division multiplexing (WDM) channels of the network, which are assigned to the concentrator 210 for purposes of uplink and downlink communication. Such a design allows for the optical network interface of the concentrator 210 to operate at relatively low frequencies (as compared to the frequencies if WDM channels are not used, such as a single wavelength carrier channel, for example).

As depicted in FIG. 5, in general, the concentrator 210 therefore includes optical transceivers 524 and 526 for the high speed telemetry network; physical interfaces 512 and 524 for the low speed telemetry network; and protocol conversion and switching fabric 520 for forming a communication bridge between the low speed and high speed telemetry networks.

Figure 6A:
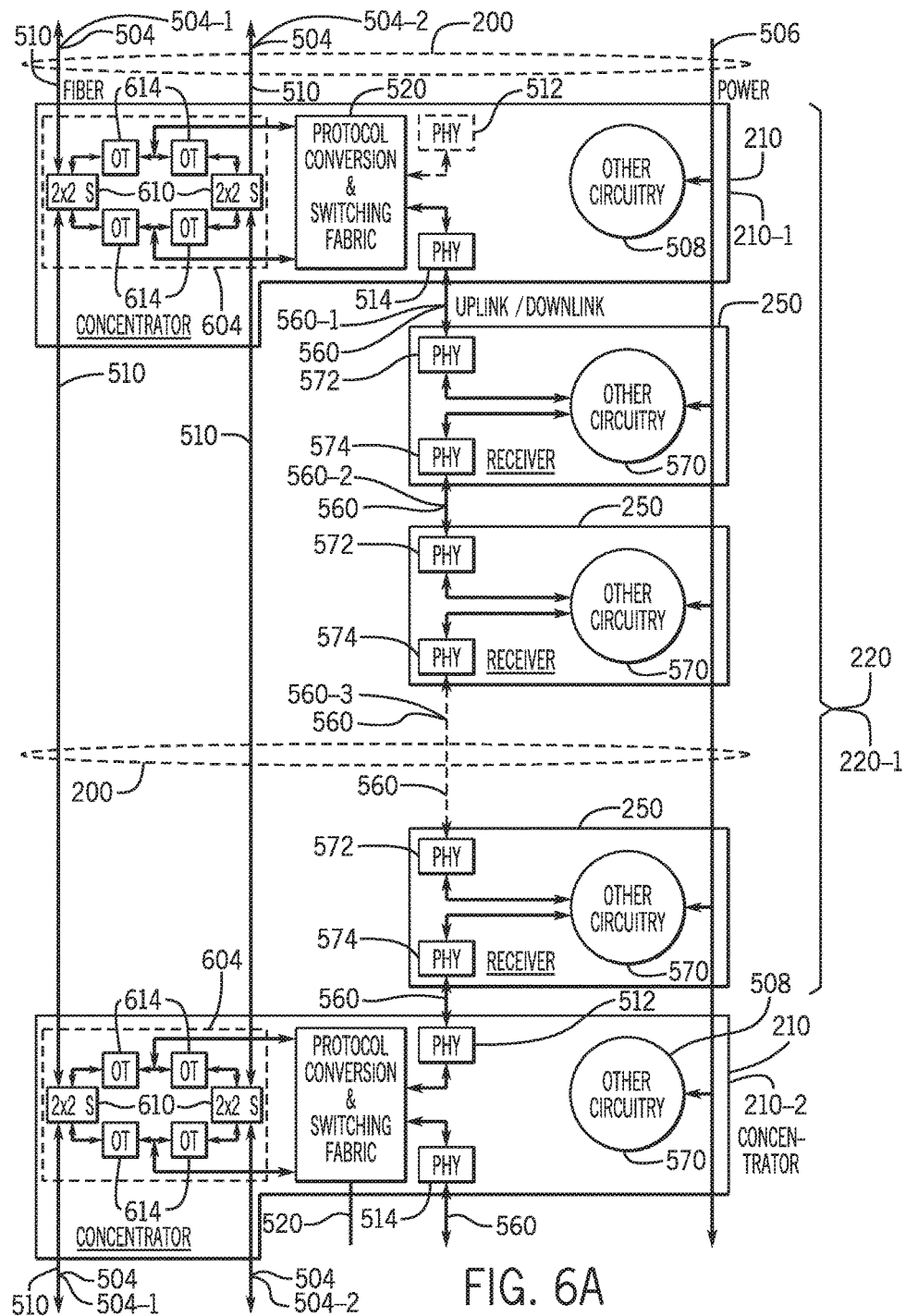

Referring to FIG. 6A, the cable 200 may contain multiple optical fibers 504 (two optical fibers 504-1 and 504-2, being depicted in FIG. 6A) in accordance with further example implementations. The multiple optical fibers may be advantageous for purposes of adding redundancy. In this manner, as shown in FIG. 6A, in accordance with example implementations, the concentrator 210 contains a high speed telemetry network interface 604 that includes optical 2×2 switches 610 and four optical transceivers 614. The 2×2 optical switches 610 have two modes that are controlled by signals to either place the interface 604 in a bypass mode in which the concentrator 210 is not coupled to the high speed telemetry network; or a connected mode in which the concentrator 210 is coupled to the high speed telemetry network for purposes of communicating data.

In general, a given concentrator 210 may be placed in the bypass mode to remove a "bad" unit from the fiber optic backbone. In the connected mode, the optical switches 610 couple the optical transceiver 614 to the optical fibers 504.

The control signals of the optical switches 610, in accordance with example implementations, are coupled to pull up and/or pull down resistors (not shown) in addition to any other signals provided by the concentrator 210, for purposes of maintaining the switches 610 in respective decoupled states to, by default, place the interface 604 in the default mode. In this manner, in accordance with example implementations, when the concentrator 210 is powered up in the default mode, the concentrator 210 performs one or more tests for purposes of determining whether the concentrator 210 is to be coupled to the fiber optic backbone and thereby transition to the connected mode.

Figure 6B:
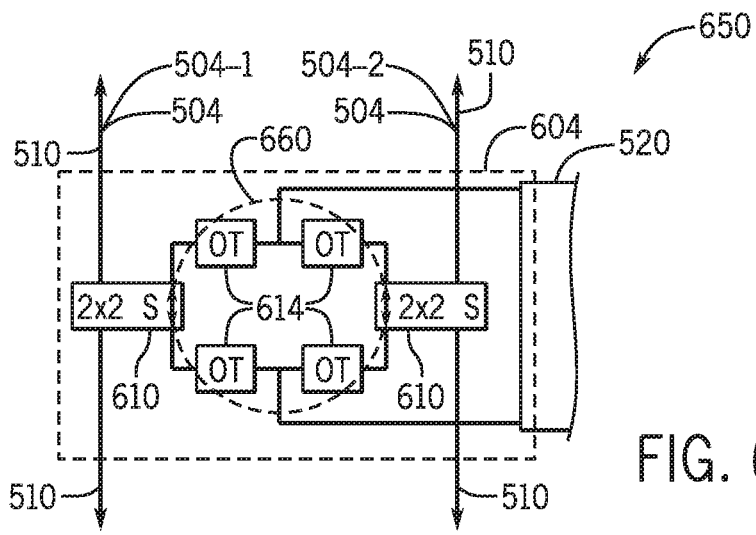
FIG. 6B is a schematic diagram illustrating a loopback test used by the concentrator of FIG. 6A according to an example implementation.
Figure 6C:
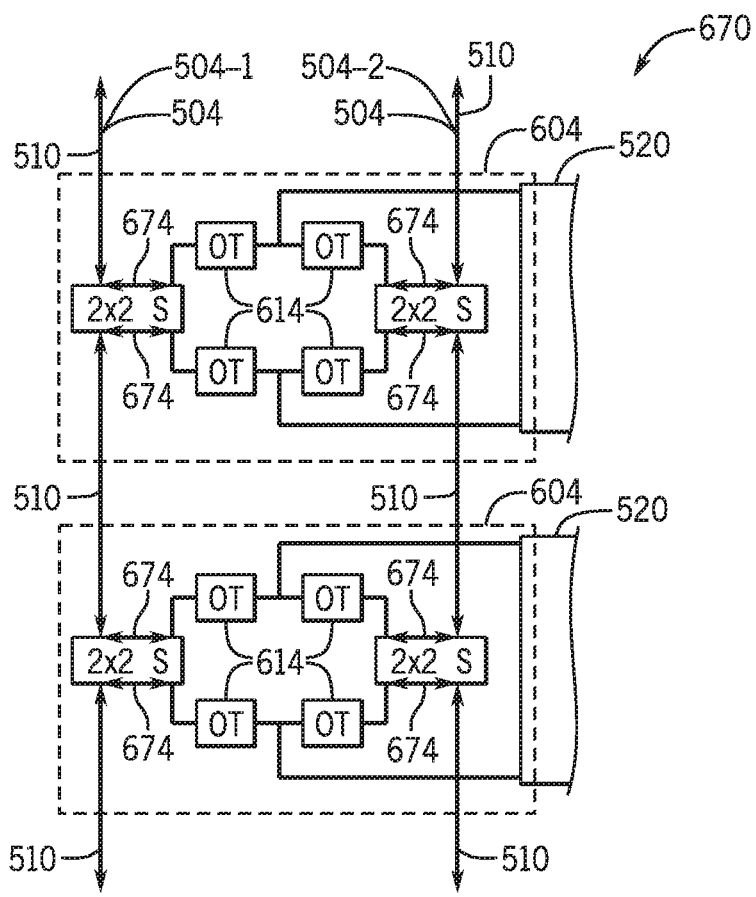
FIG. 6C is a schematic diagram illustrating redundant optical switch operation of the concentrator of FIG. 6A according to an example implementation.

As a more specific example, in accordance with example implementations, when the concentrator 210 is powered up, the concentrator 210 performs a loopback test on the optical transceivers 614 to test the functionality of the transceivers 614. A loopback test 650 is generally depicted in FIG. 6B. In this test, the concentrator 210 generates "dummy" data and measures the quality of it within the loop. After performing the loopback test, the concentrator 210 determines whether to transition the concentrator 210 from the bypass mode to the connected mode. In this manner, if a determination is made to couple the concentrator 210 to the fiber optic backbone, the concentrator 210 transitions the optical switches 610 to couple the optical transceivers 614 to the optical fibers 504, as depicted in FIG. 6C. Thus, using the loopback test, the concentrator 210 may discover one or more "bad" optical transceivers 614, which keeps the concentrator 210 in its default bypass mode to prevent defective equipment from being coupled to the high speed telemetry network.

The bias of the concentrator 210 to be disconnected from the high speed telemetry network also aids in disconnecting a concentrator 210 that malfunctions after power up. In this manner, if a concentrator 210 begins malfunctioning, the control signals to the optical switches 614 "disappear" (i.e., are deactivated), and the pull-up and pull-down resistors cause the switches 610 to decouple from the high speed telemetry network, thereby transitioning the concentrator 210 back into the bypass mode.

The above-described redundancy and ability of the concentrators 210 to decouple from the high speed telemetry network by default permits the scalable borehole acquisition system 120 to continue its data acquisition in the event of equipment failure, eliminating, for example, the need to retrieve the entire system 120 and repair a bad concentrator 210, thereby saving rig and logistics time, and the costs associated therewith.

Referring back to FIG. 6A, in accordance with example implementations, a given concentrator 210 uses both optical fibers 504-1 and 504-2 in its transmission. In other words, in accordance with some example implementations, the optical transceivers 614 transmit the same data simultaneously in a redundant fashion to both optical fibers 504-1 and 504-2. However, for purposes of receiving data, the interface 604 monitors the quality of data on both optical fibers 504-1 and 504-2. In this manner, the data extracted from both fibers is monitored continuously and based on the quality of each link (a bit error rate, for example), the interface 604 selects the "best" optical fiber 504-1 or 504-2 and extracts the data from the selected fiber. In accordance with example implementations, this is a dynamic process, as a given concentrator 210 may change extracting data between the two fibers 504-1 and 504-2 during the data acquisition.

Figure 7A:
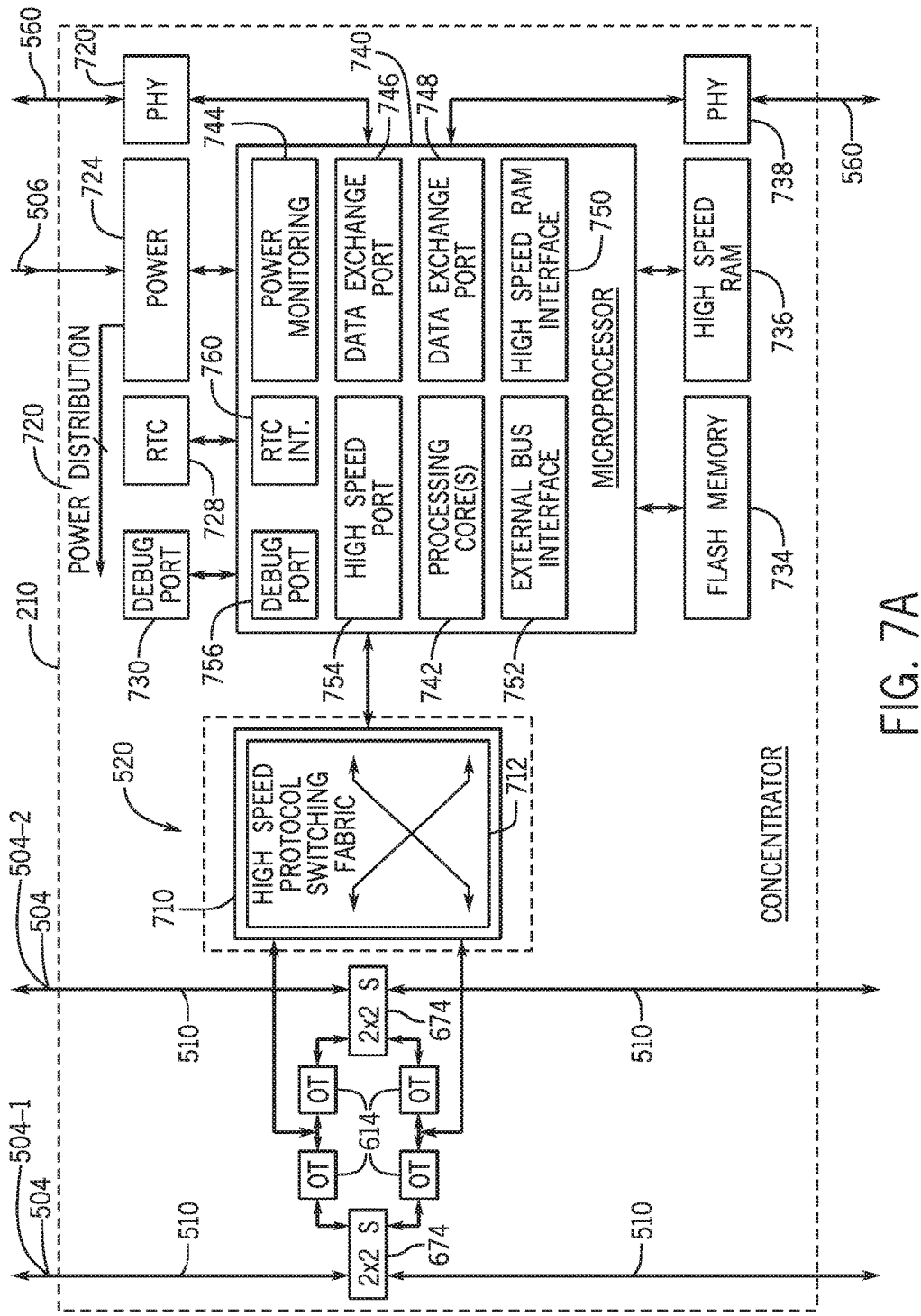
FIGS. 7A, 7B, 7C and 7D are schematic diagrams of concentrators according to example implementations.

Referring to FIG. 7A, in accordance with example implementations, the concentrator 210 may be constructed from commercially available off-the-shelf components. For example, the concentrator 210 may include a component 710 that provides a switching fabric 712 that uses a high speed protocol and at least one microprocessor 740. The microprocessor 740, among its various functions, receives data on its data exchange ports 746 and 748 from downhole 738 and uphole 720 copper telemetry physical interfaces, repackages the data into the format of the high speed data protocol (layer 2 and/or layer 3 of the OSI model) and forwards the reformatted data through a high speed port 754 to switching fabric 710. In accordance with example implementations, the microprocessor 740 may also run higher layers of the OSI model, as well as applications related to borehole seismic and microseismic data acquisition.

The switching fabric 710 runs at the speed of the high speed data communication protocol (running on the fiber optic backbone) and routes the data based on the addresses assigned to the data, via the optical transceivers 614 using the physical layer (layer 1 of the OSI model) of the implemented high speed protocol. In order to accomplish this, the microprocessor 740, in accordance with example implementations, has one or multiple processing cores 742 that executes program instructions at relatively very high speeds. For this purpose, the microprocessor 740 may access instructions and other data stored in a high speed random access memory (RAM) 736, which is coupled to a high speed RAM interface 750 of the microprocessor 740.

In accordance with example implementations, the concentrator 210 further includes a flash memory 734 that is coupled to an external bus interface 752 of the microprocessor 740. In accordance with example implementations, the flash memory 734 stores the "boot strap" and application software instructions that are executed by the processing core(s) 742. Among its other features, in accordance with example implementations, the microprocessor 740 includes a debugging port 756 for testing and debugging purposes.

In accordance with example implementations, the concentrator 210 further includes power regulation circuitry 724 that receives power from one or multiple lines 506 (copper lines, for example) of the cable 200 and generates and distributes (via distribution lines 720) various regulated voltages to different power consuming components of the system. The power unit 724 also, in accordance with example implementations, monitors the status of the power that enters the concentrator 210 and the power that has been distributed to the components via the lines 720.

In seismic and microseismic measurements, the measurement data is time-stamped with a time that is synchronized with the global positioning satellite (GPS) time (acquired from a satellite, as depicted by reference numeral 112 of FIG. 1). An RTC unit 728 of the concentrator 210 contains circuitry (a phase locked loop containing a voltage controlled oscillator (VCO), for example), which is regularly adjusted so that the RTC is synchronized with the GPS clock. The GPS clock is communicated through the high speed telemetry network from the surface system. The RTC unit 728 may maintain synchronization through various protocols, depending on the particular implementation.

Figure 7B:
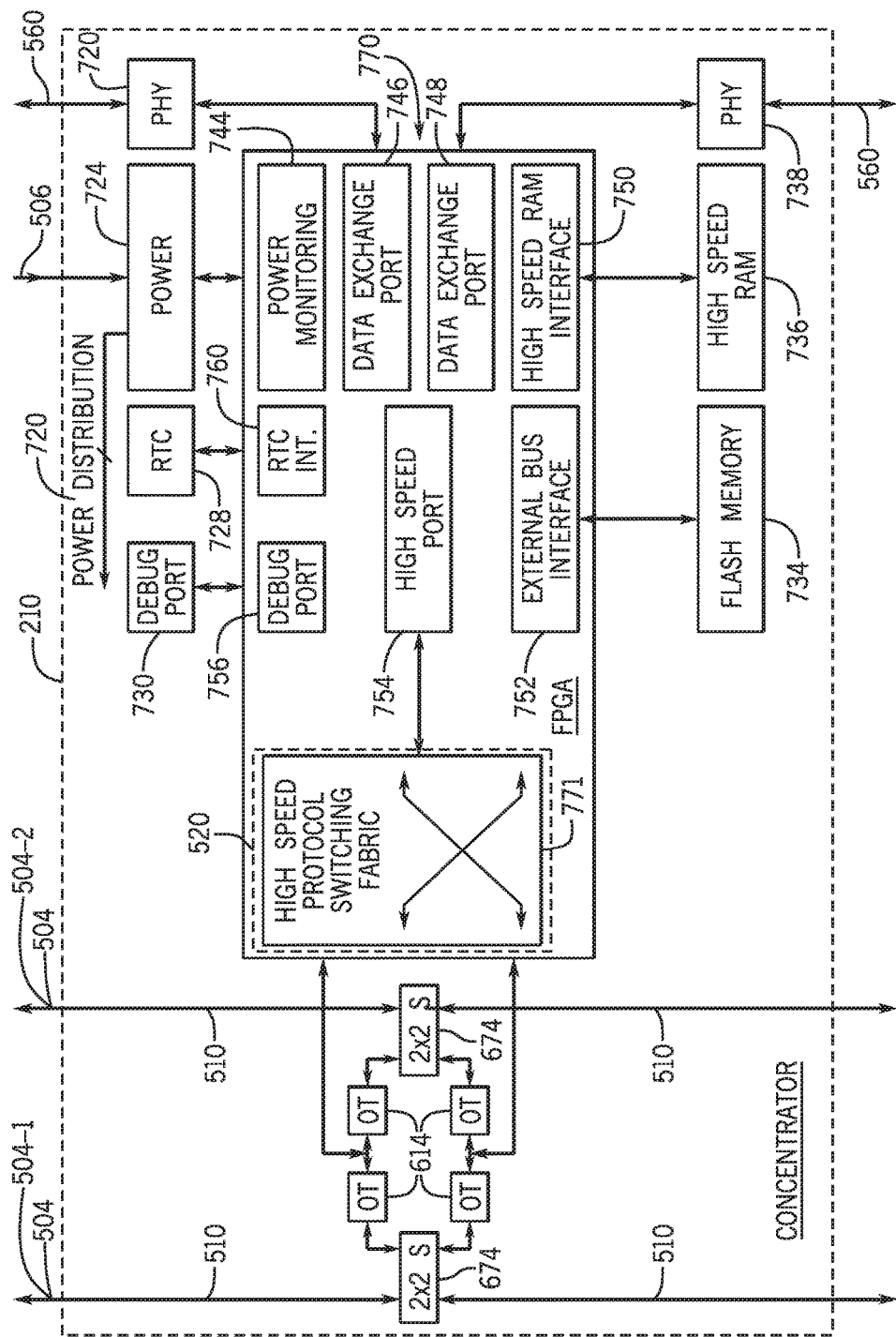
Figure 7C:
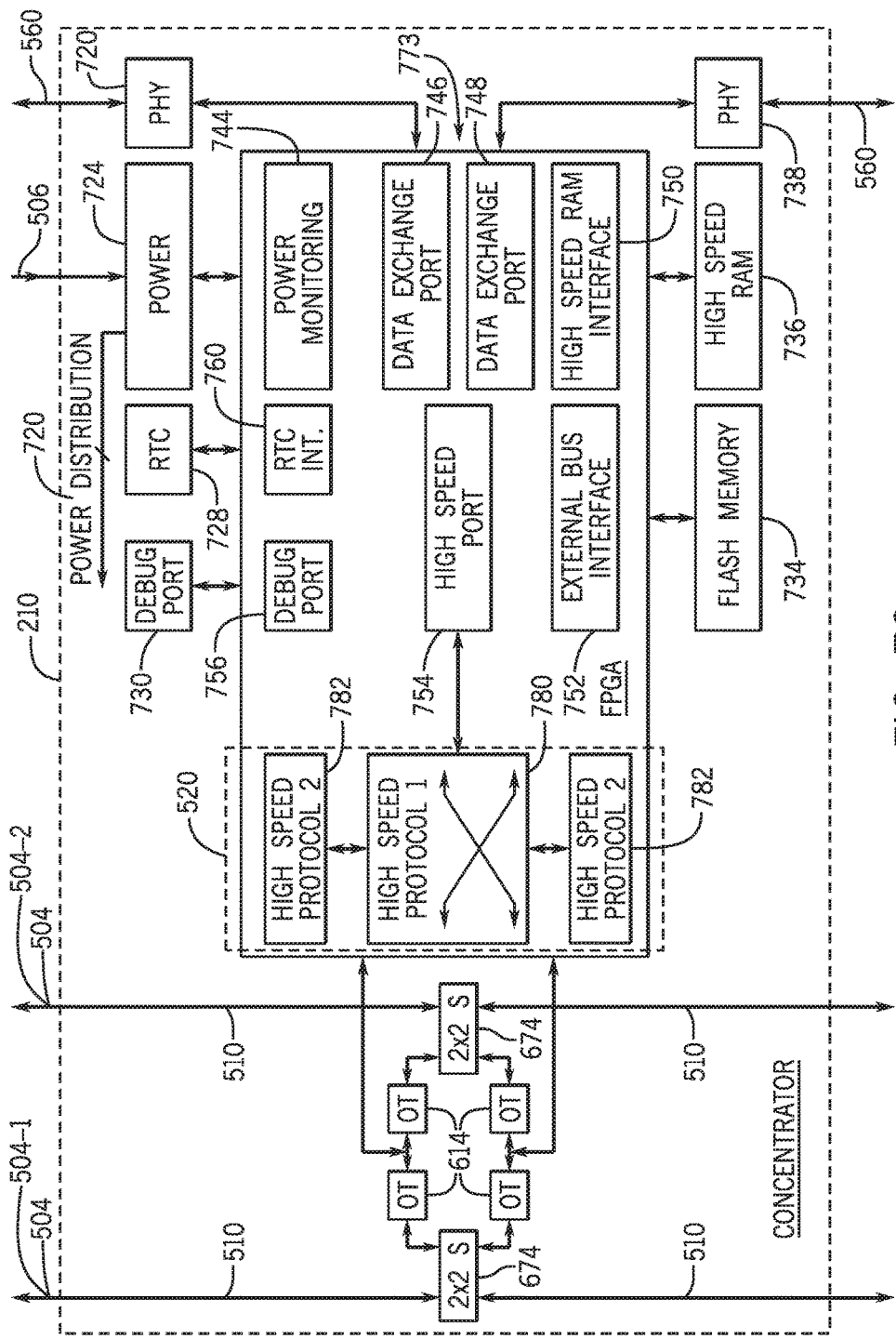

FIG. 7B depicts a further example implementation in which the microprocessor 740 and the component 710 are replaced by a field programmable gate array (FPGA) 770 which integrates these two components together, as the switching fabric 771 is integrated into the FPGA 770. FIG. 7C depicts a further example implementation similar to the implementation of FIG. 7B, but where an FPGA 773 replaced the FPGA 770 of FIG. 7B. The FPGA 773 has a similar design to the FPGA of FIG. 7B, but the switching fabric 771 of FIG. 7B is replaced with fabric 711 that is constructed to allow one high speed protocol 782 to run over another high speed protocol 780.

Figure 8A:
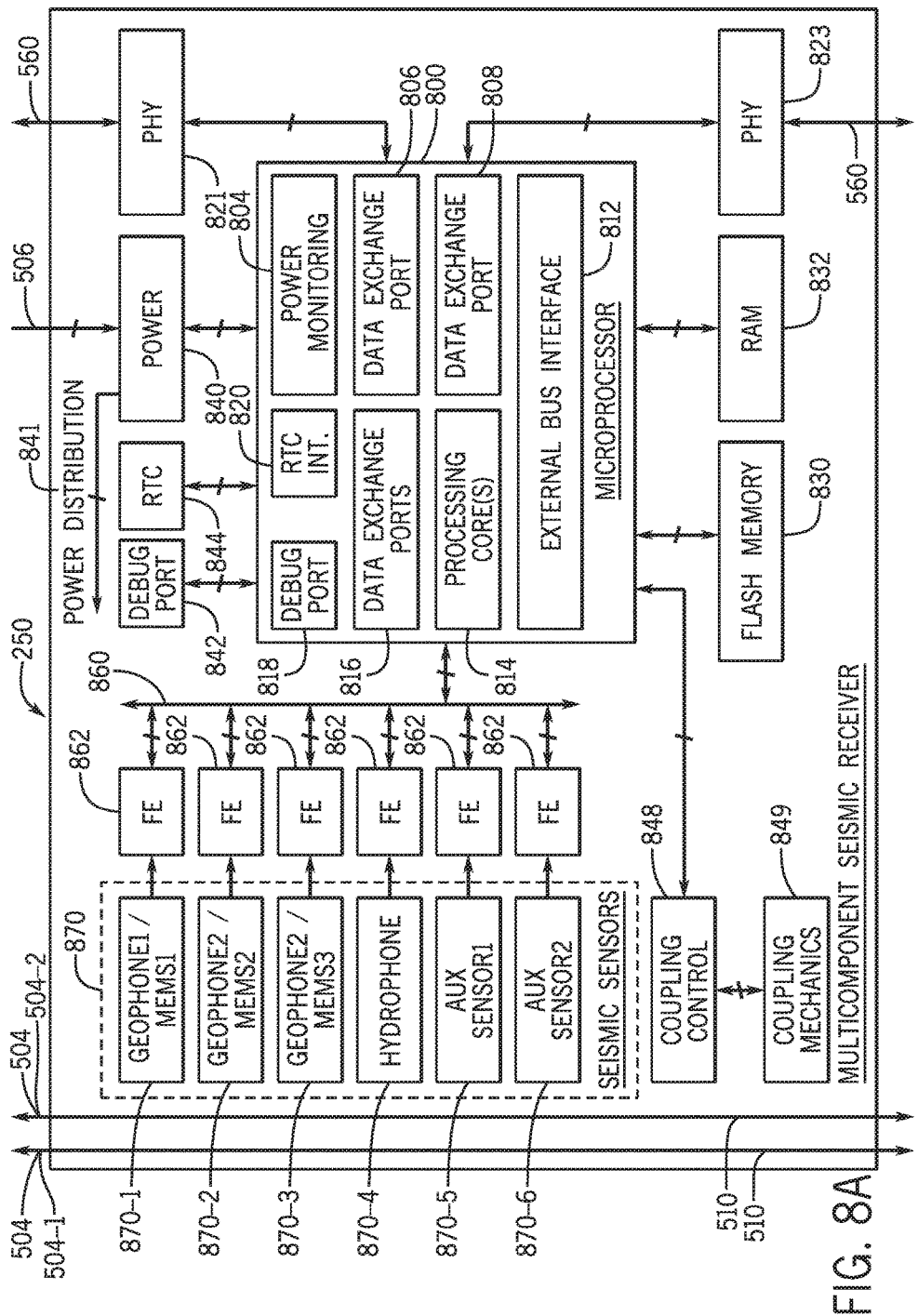
FIGS. 8A, 8C and 8D are schematic diagrams of multi-component seismic receivers according to example implementations.

Referring to FIG. 8A, in accordance with some implementations, the seismic receiver 250 is a multicomponent receiver and is constructed from commercially available off-the-shelf components. For this implementation, the receiver 250 includes a microprocessor 800, which has one or more processing cores 814 and data exchange ports 806 and 808 for communicating data with copper telemetry physical interfaces 821 and 823, respectively. The microprocessor 800 also includes one or more data exchange ports 816 for purposes of coupling (via a bus 860) with front end interfaces 862 of various seismic sensors 870 of the receiver 250.

In general, the microprocessor 800 runs the low speed data protocol stack (layer 2 and/or layer 3 of the OSI model); and in accordance with some implementations, the microprocessor 800 may run higher layers of the OSI model as well as applications related to borehole seismic and microseismic data acquisition. As depicted in FIG. 8A, the receiver 250 includes a RAM 832, which shadows the instructions executed by the processing core(s) 814. A flash memory 830 of the receiver 250 may store the boot strap and application software for execution by the processing core(s) 814. The microprocessor 800 may contain various other components, such as a debugging port interface, an RTC interface 820, a power monitoring interface 804, an external bus 812, and so forth.

Similar to the concentrator 210, the receiver 250 may contain at least one debugging port 842, an RTC unit 844 and a power unit 840, which perform functions similar to the corresponding units of the concentrator 210.

As depicted in FIG. 8A, in accordance with example implementations, the seismic sensors 870 may include three geophones 870-1, 870-2 and 870-3, which are aligned along orthogonal sensitive axes (x, y and z axes, for example) and a hydrophone 870-4. Moreover, the seismic sensors 870 may include auxiliary sensors such as the illustrated sensors 870-5 and 870-6 (temperature sensors, pressure sensors, and so forth). Front end interfaces 862 are responsible for the reception of the seismic waves in the form of analog signals from the sensors 870, amplifying them and digitizing them. The front end interfaces 862 may include signal conditioning units, filters and other circuitry, as can be appreciated by one of ordinary skill in the art. In accordance with some implementations, the front end interfaces 862 may receive control data from the microprocessor 800 via the bus 860 as well as communicate the acquired digitized sensor data to the microprocessor 800. As an example, in accordance with some implementations, the front end interfaces 862 may receive control data to calibrate a given sensor or change different operating variables by accessing registers residing inside the interface 862.

FIG. 8A also depicts coupling control 848 and coupling mechanics 849. In general, the seismic sensors 870 are coupled to the formation where the sensors 870 are physically located. The coupling mechanics 849 may include an arm-based coupling system (for open hole applications) or a magnetic-based coupling system (for cased hole applications). The coupling control 848 represents motion control and mechanical elements, as well as control circuitry, that may be controlled by the microprocessor 800 for purposes of controlling the coupling mechanics 849. As depicted in FIG. 8A, the optical fibers 504-1 and 504-2 pass through the receiver 250 without interacting with any elements of the receiver 250, in accordance with example implementations.

Figure 8B:
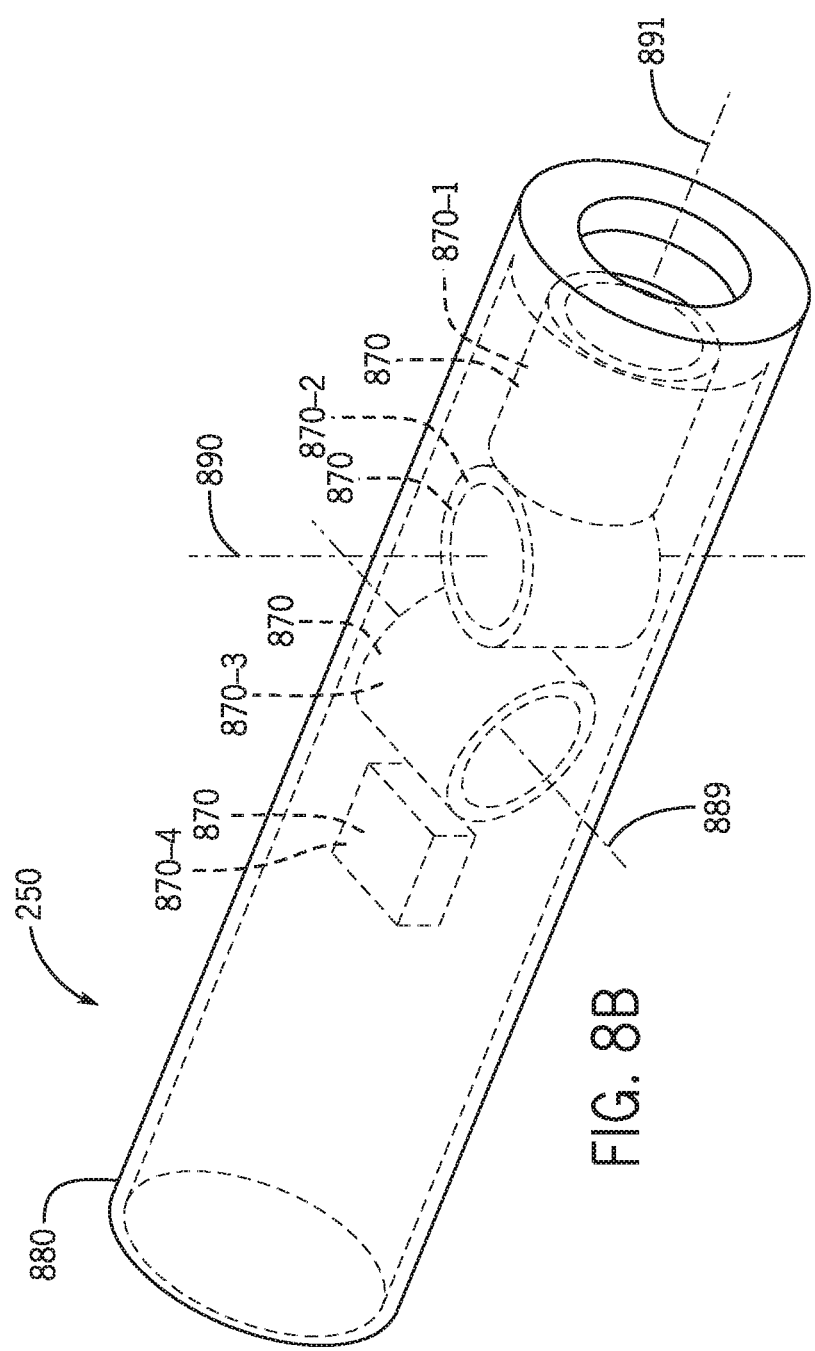
FIG. 8B is a perspective view of a multicomponent seismic receiver according to an example implementation.

Referring to FIG. 8B, in accordance with some implementations, the seismic sensors 870 may be disposed in a sensor package, such as in the depicted cylindrical housing 880 that is constructed to be connected inline with the cable 200. Generally, the hydrophone 870-4 may be constructed to record wider band (higher frequency side) signals, which may not be possible with the geophones 870-1, 870-2 and 870-3 due to the limitation of the sensor coupling. There may be other uses of the hydrophone 870-4 such as supplementary measurements for the geophone measurement (such as for purposes of noise reduction). For microseismic applications, the hydrophone data may be useful for corner frequency determination for the events identified and located by the geophone data. As shown in FIG. 8B, the geophones 870-1, 870-2 and 870-3 are oriented along corresponding sensitive axes 891, 890 and 889, respectively.

Figure 9:
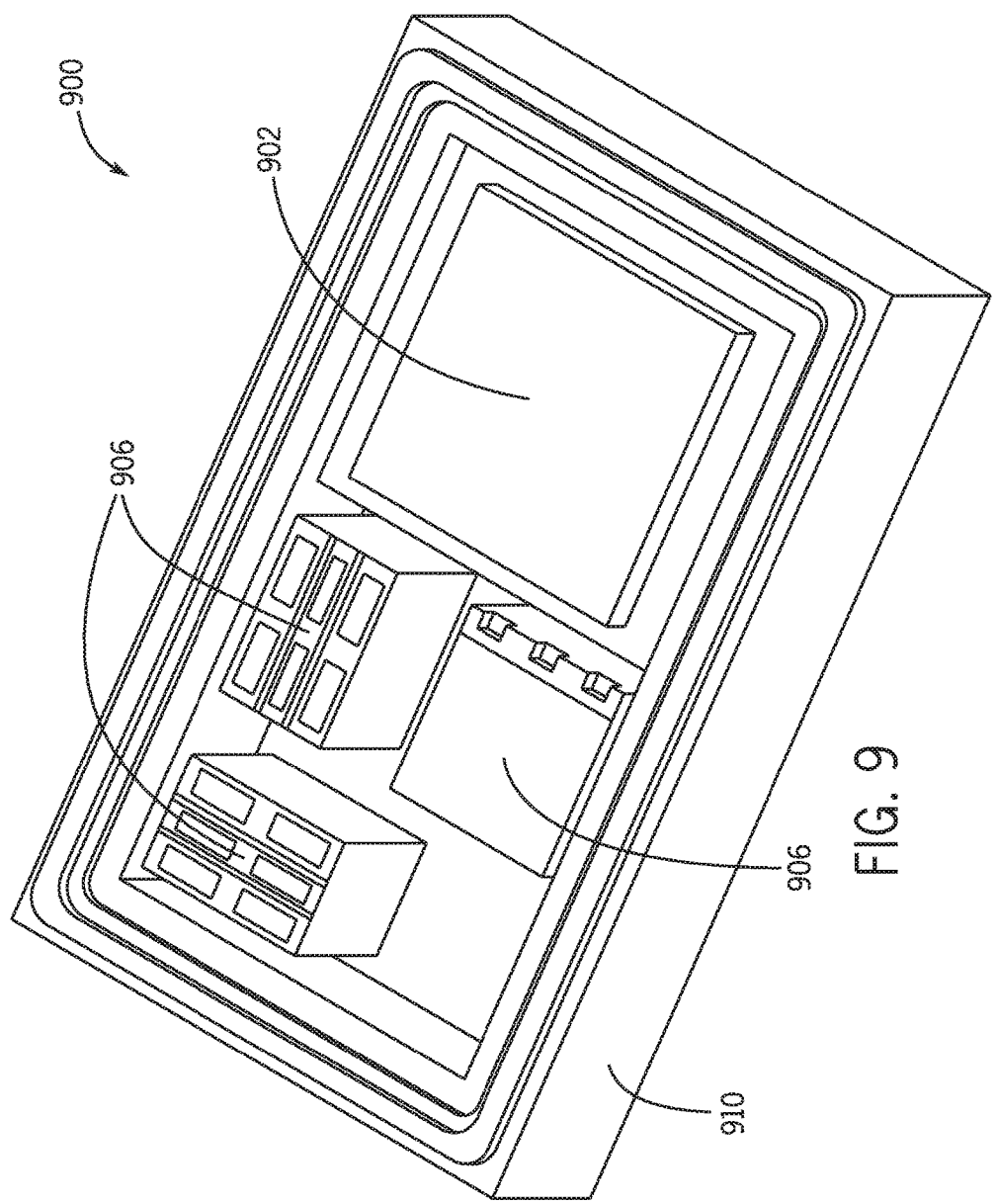
FIG. 9 is a perspective view of a microelectromechanical system (MEMS)-based multicomponent seismic receiver according to an example implementation.

Referring to FIG. 9, in accordance with example implementations, the geophones may be microelectromechanical system (MEMS)-based sensors that are arranged in a relatively compact package 900. For this example, the package 900 includes three MEMs accelerometers 906 that are disposed in a compact, hermetically sealed container along different orthogonal sensitive axes. It is noted that FIG. 9 depicts a space-friendly implementation in which the three orthogonal MEMs accelerometers 906 are implemented together with corresponding front end circuitry 902 within a single application specific integrated circuit (ASIC) 910. This reduces the size and weight of the seismic sensors drastically, in accordance with example implementations and enhances the deployment of system containing a large number of receivers.

In accordance with example implementations, the lower speed copper-based communication protocol used on the lower speed telemetry network (the twisted copper wire network, for example) is Fast Ethernet; and the two protocols that are used on the high speed telemetry network are as follows: a synchronous digital hierarchy (SDH) protocol and a Gigabit Ethernet protocol. The Gigabit Ethernet protocol "runs" over the SDH protocol.

Figure 7D:
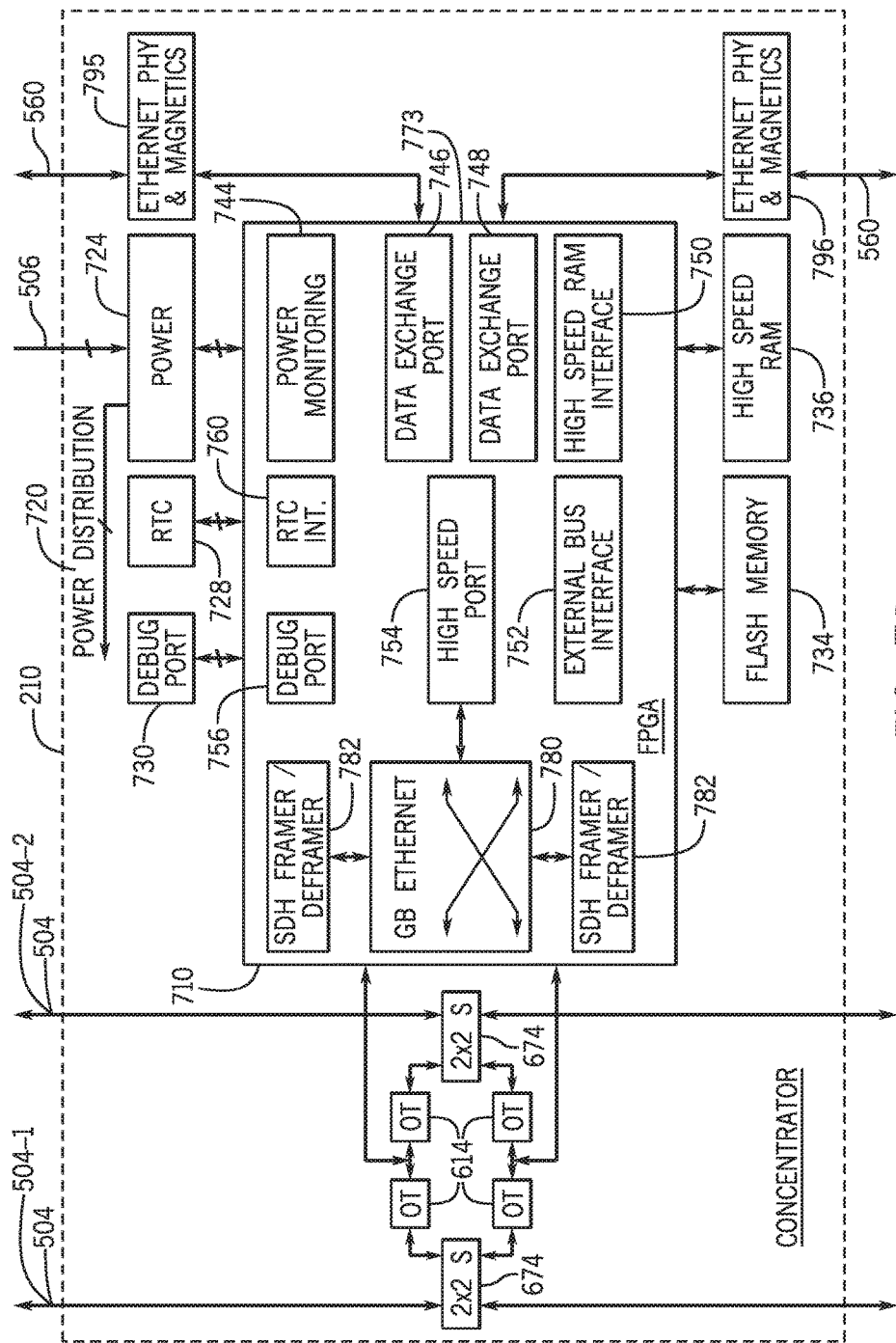

As a more specific example, FIG. 7D depicts a concentrator 210 that has, in general, a similar design to the concentrator 210 of FIG. 7C, with similar reference numerals being used. The high speed protocol 2 782 of FIG. 7C is formed by an SDH framer/deframer and in which the high speed protocol 1 780 of FIG. 7D is formed by a Gigabit Ethernet switching fabric. In accordance with example implementations, the SDH framer/deframer blocks 782 may be 622 Mbps and may be designed in Verilog hardware design language (VHDL) or another hardware description language.

In general, the Ethernet packets are encapsulated, or extracted, from the SDH frames. Therefore, the communication with the copper telemetry sections are based on Ethernet packets. In this connection, the FPGA 773 (or microprocessor) runs the MAC layer of the Ethernet. For purposes of coupling the Gigabit Ethernet switch switching fabric 780 to the SDH framer/deframer blocks 782 running at 622 Mbps, the speed of the Gigabit Ethernet switching fabric 780 is reduced. For example, commercially off-the-shelf Gigabit Ethernet switches may run at 125 Mhz, whereas for the exemplary implementation of FIG. 7D, the Gigabit Ethernet switching fabric 780 may run at 77.76 Mhz. This prevents a smooth connection (without congestion and overflow) between the SDH framer/deframer blocks 782 and the Gigabit Ethernet switching fabric 780.

The advantages of having two high speed protocols may be the following, in accordance with example implementations. SDH has a precision time synchronization mechanism built into it which allows the concentrators to synchronize their RTCs to the GPS time. It is noted that commercially available off-the-shelf Fast Ethernet devices are available to perform RTC synchronization based on IEEE1588 Standard (Standard for a Precision Clock Synchronization Protocol for Networked Measurement and Control Systems). SDH scales in steps of four and not in steps of 10 as Ethernet does. Therefore, to make the system scalable, the system may run at 2.488 Gbps (rather than of 10 Gbps of the next Ethernet upgrade). This is important due to the performance limitations of the FPGAs and other components at high speeds, running at high temperature environment of oilfield borehole. And finally, as will be described later, most surface equipment and computing engines have standard Ethernet connections. And therefor, Ethernet packet based communication of data becomes an important part of this implementation at a system level.

Figure 8C:
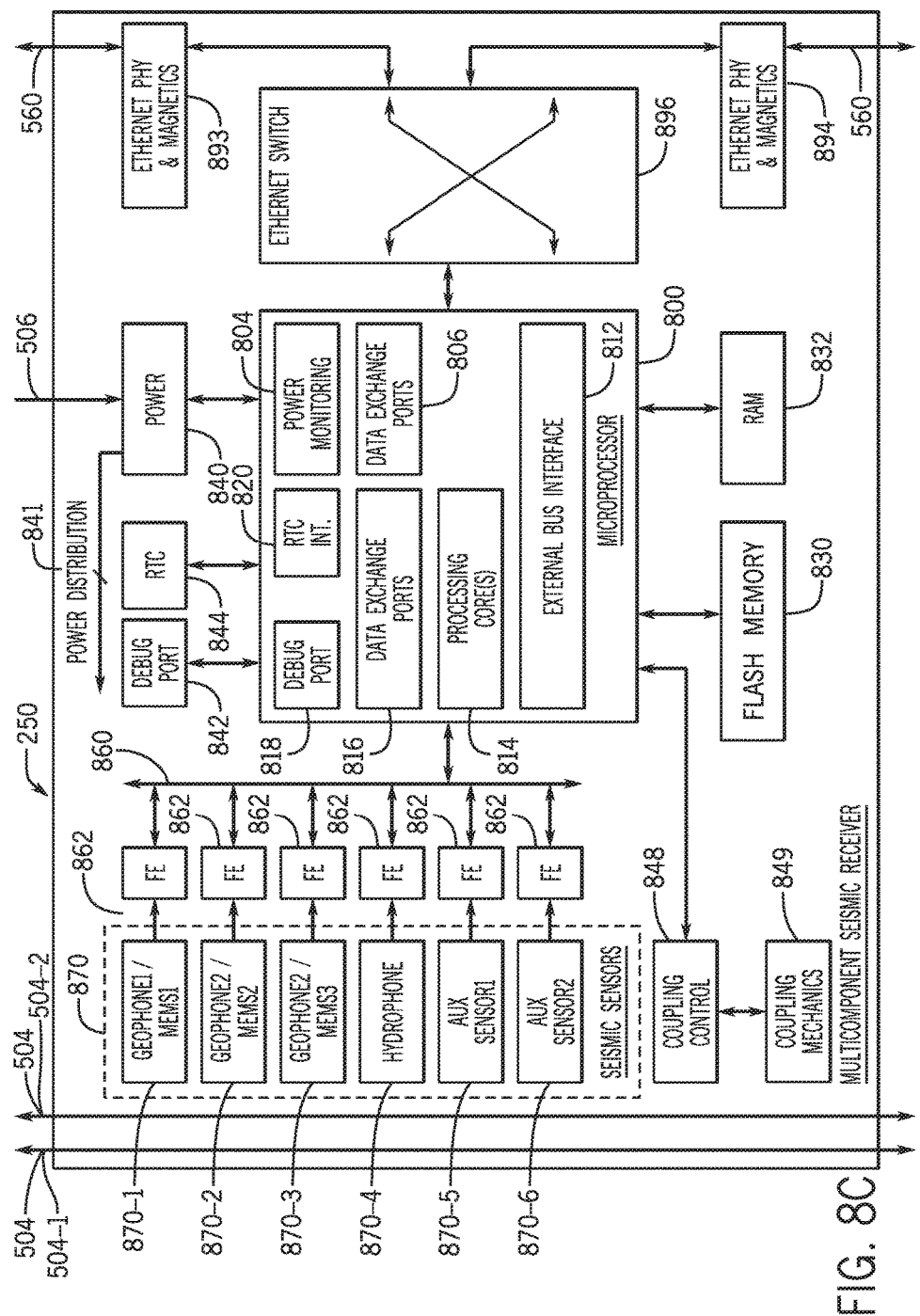
Figure 8D:
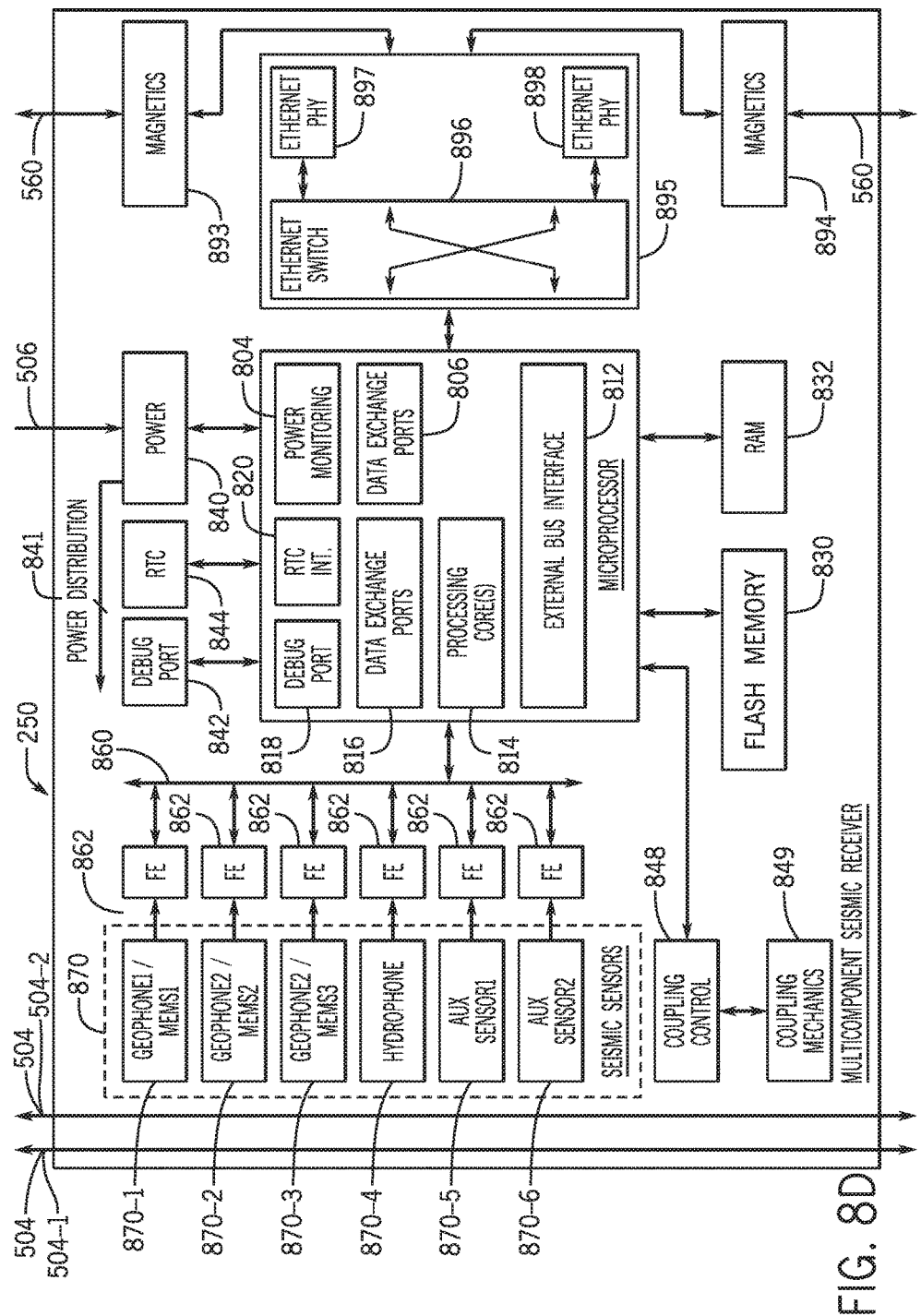

FIGS. 8C and 8D depict further exemplary implementations of the receiver 250. Referring to FIG. 8C, for this implementation, the receiver 250 has Fast Ethernet switching fabric 896 that is coupled to Ethernet physical and magnetic components 893 and 894 and is coupled on the other side to microprocessor 800 (similar design with other microprocessor of FIG. 8A). The switching fabric 896 routes the Ethernet packets, and the microprocessor 800 runs the MAC layer of the Ethernet. Referring to FIG. 8D, in accordance with example implementations, a commercially off-the-shelf component may be used, which integrates the Ethernet physical layers of the units 893 and 894 and the Ethernet switching fabric 896 of FIG. 8C to produce the implementation of the receiver 250 that is depicted in FIG. 8D. Referring to FIG. 8D, for this implementation, the component includes physical Ethernet interfaces 897 and 898 and external magnetics (fillers, for example) 893 and 894.

As noted above, the concentrators 210 and receivers 250 have RTCs that are time synchronized with the GPS time. Seismic and micro-seismic data are timestamped with the RTC value synchronized with the GPS time. In order to do this, the exemplary implementation includes two clock domains. As will be described below, the GPS reference clock is residing on the surface and distributes the clock to the system through the fiber optic backbone.

In accordance with example implementations, a clock domain for synchronizing of RTCs reside on the concentrators 210. In this domain the RTC synchronization information is transmitted in the SDH headers (as a part of the protocol). After synchronizing concentrator's RTCs, the synchronized clock value is distributed from the concentrators to the Fast Ethernet sections via Ethernet packets.

In accordance with example implementations, a clock domain for synchronizing the RTCs resides on the receivers 250. The synchronized clock value received from concentrators is utilized in conjunction with the IEEE1588 Standard (Standard for a Precision Clock Synchronization Protocol for Networked Measurement and Control Systems), which is implemented in many COTS Fast Ethernet PHYs and switches. The SW part of the protocol will run on the receiver's microprocessor.

The RTC block may have numerous different designs in accordance with the various possible implementations, as can be appreciated by one of skill in the art. As an example, the RTC block may include a control loop to sustain a stable clock source over time. The RTC block may further include a voltage controlled oscillator (VCO). The control voltage of the VCO is generated by a DAC (Digital to Analog Convertor). Registers residing in a programmable device (such as a PLD or a FPGA), keep values of the current time, and track its drift by receiving regular sync values and signals over the telemetry system. Based on the measured drift, the DAC is controlled to adjust the frequency of the VCO and the GPS synchronized value of the RTC block within a given accuracy.

In accordance with example implementations, Transport Control Protocol (TCP)/Internet Protocol (IP) may be run over the entire system. In that case each unit (i.e. concentrator and receiver) is assigned an IP address using an address configuration protocol such as the DHCP (Dynamic Host Configuration Protocol). The Main DHCP server may reside on the surface system for the example implementations. Moreover, the concentrators may include DHCP clients to receive IP addresses from the surface system and DHCP servers to provide receivers with IP addresses. The receivers may include DHCP clients. A more static (and therefore simpler) distribution of the IP addresses may also be used, in accordance with further example implementations.

Figure 10:
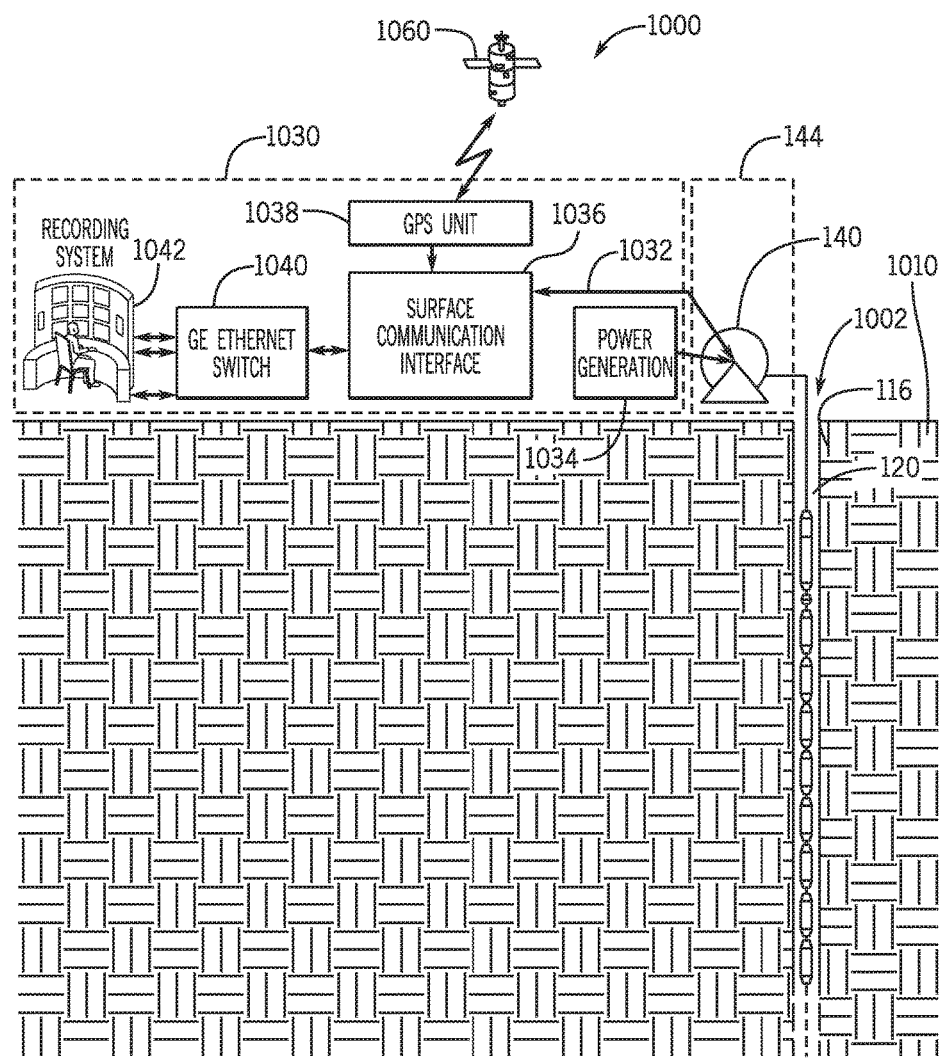
FIG. 10 is a more detailed schematic diagram of a surface system of FIG. 1D according to an example implementation.

FIG. 10 depicts a surface system 1000 for use with the scalable borehole seismic system according to example implementations. In further examples, the surface system 1000 includes the section reels 140 and the fibers and power wires of the scalable borehole acquisition system 120 interface with the surface system 1000 through a hybrid (i.e., electrical and optical) slip ring 146 (see FIG. 1) that resides on a drive unit 144 for the section reel 140.

Amend its other components 1030, the surface system 1000 includes a power generation module 1034 that provides AC and/or DC voltages to the entire array of receivers 250 and concentrators 210. In accordance with example implementations, the power generation unit 1034 may include a power generator along with AC/DC conversion circuitry.

Figure 11:
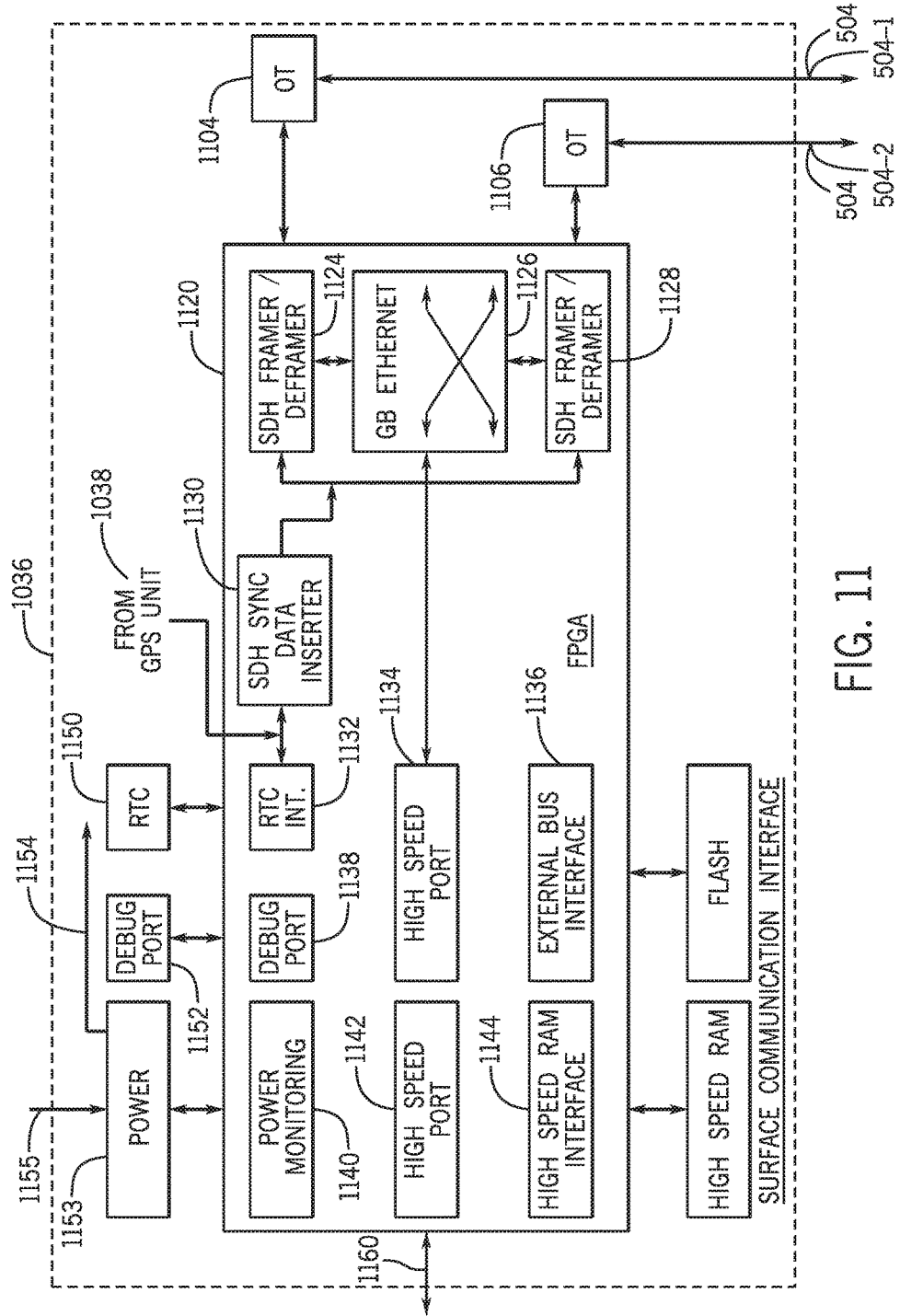
FIG. 11 is a schematic diagram of a surface communication interface of the surface system of FIG. 10 according to an example implementation.

The surface system 1000 further includes a surface communication interface 1036, which is depicted in FIG. 11. Referring to FIG. 11, in accordance with example implementations, the surface communication interface 1036 has an architecture that is similar to the architecture of the concentrator 210. In accordance with example implementations, the surface communication interface 1036 includes an FPGA 1120 that communicates with the optical fibers 504-1 and 504-2 via optical transceivers 1104 and 1106, respectively; and the FPGA 1120 furnishes the extracted data (via a link 1160) to a Gigabit Ethernet switch 1040 (see FIG. 10).

The FPGA 1120 includes an SDH synchronization data inserter 1130, which receives synchronization signals from the GPS unit 1038 and uses the synchronization signals to synchronize its own RTC to the GPS time. The SDH synchronization data inserter 1130 manipulates the output of the RTC interface block 1138 to generate synchronization information that is entered into SDH packet headers and distributed to the system via the optical transceivers 1104 and 1106. SDH framer/deframers 1124 and 1128 and a Gigabit Ethernet switch 1126 operate similar to the corresponding components of the concentrator 210. In this manner, similar to the concentrator 210, these components continuously monitor the quality of the data received from both fibers 504-1 and 504-2 and selects the one with the lower bit error rate. Similar to the concentrator, the circuitry also transmits the same data on both fibers.

Among its other features, the FPGA 1130 may, in accordance with example implementations, include components similar to the concentrator 210, such as a power monitoring interface 1140; a debugging port 1138; an RTC interface 1132; high speed ports 1134 and 1142; a high speed RAM interface 1144; and an external bus interface 1136. Moreover, as depicted in FIG. 11, the FPGA 1130 may be coupled to a high speed RAM and a flash memory 1139.

Referring back to FIG. 10, the Gigabit Ethernet switch 1040 has one port on one side connected to the synchronization and Gigabit Ethernet packet extraction unit and several ports on the other side that are connected to different servers performing difference tasks, residing on a recording system 1042. The routing of data to and from the servers is performed based on a routing protocol that is implemented on the switch 1040, in accordance with example implementations. Open Shortest Path First (OSPF) is an example of the protocol that uses IP addresses to route the data.

In accordance with example implementations, the recording system 1042 includes several servers and a field crew. The crew is responsible for controlling the deployment of the system, motion control parts of the system, powering up/off the system, testing the system during the deployment and monitoring the healthiness of the system. The crew is also responsible for recording and pre-processing the data, which at a later stage is sent to a processing center for post-processing and interpretation.

Traditional systems may use a computer that executes applications in a sequential manner to record and pre-process the data. However, in accordance with example implementations, the use of a multi-server system may run several applications in parallel. Due to the added computation power, this allows for further analysis of the acquired data beyond pre-processing. A more comprehensive analysis of data at the well site eliminates any lost time due to discovery of "bad" data (at a later time) and costly repetition of the measurement by re-deployment The dynamic addressing mechanism (such as OSPF) running on the Gigabit Ethernet switch allows the data to be routed to several servers and allows parallel applications to be run on the measurement data.

Prior to the deployment of the scalable borehole acquisition system 120, each receiver section 220 may be assembled in the workshop, and tested separately (for quality insurance) and stored on one of the section reels 140 hereafter referred to as a "section reel" prior to transportation to the well site. Due to the size of the system and limitation of the size of one single reel (the reels need to be portable and light enough to be rotated by a motor of the drive unit 144), several section reels 140 are used. During the deployment of the system, the section reels 140 are used one at a time. The section reel 140 may be shifted by using a crane operation when its content (i.e. a receiver section 230) is lowered in the well.

After the deployment of the section 220 for the last section reel 140, the last receiver section 230 is connected to another reel 152 (see FIG. 1) that holds the long range telemetry cable 201 (see FIG. 2), which at one end is connected to the top concentrator 210-1 (see FIG. 2) (i.e., connected to the logging head of the top concentrator).

Referring back to FIG. 1, thus, in accordance with example implementations, the surface system includes two types of reels: section reels 140 and a single long range telemetry cable reel 152 (i.e., the reel for the segment 201 of FIG. 2). Both of these reels 140 and 152 have hybrid slip rings. The section reel 140 resides on a drive unit 144 that contains a lateral shifter. The end of the long range telemetry cable 201 on the reel 152 is connected to another slip ring, which resides on the holder for the long range telemetry cable reel 152. This slip ring connects the array of receivers and concentrators to the surface system 1030, as depicted in FIG. 10.

In accordance with example implementations, the reels 140 and 152 are "active" reels, i.e. controlled by motors.

Still referring to FIG. 1, in accordance with example implementations, the surface system includes a de-tensioner 134, which is used due to the significantly increased weight of the scalable borehole acquisition system 120. The de-tensioner 134 helps drive the cable and controls its tension. In accordance with example implementations, the surface system may also include tension devices 132 and passive sheaves 130. Various aspects of the surface system relating to the deployment and retrieval of the scalable borehole acquisition system are described below.

Figure 12:
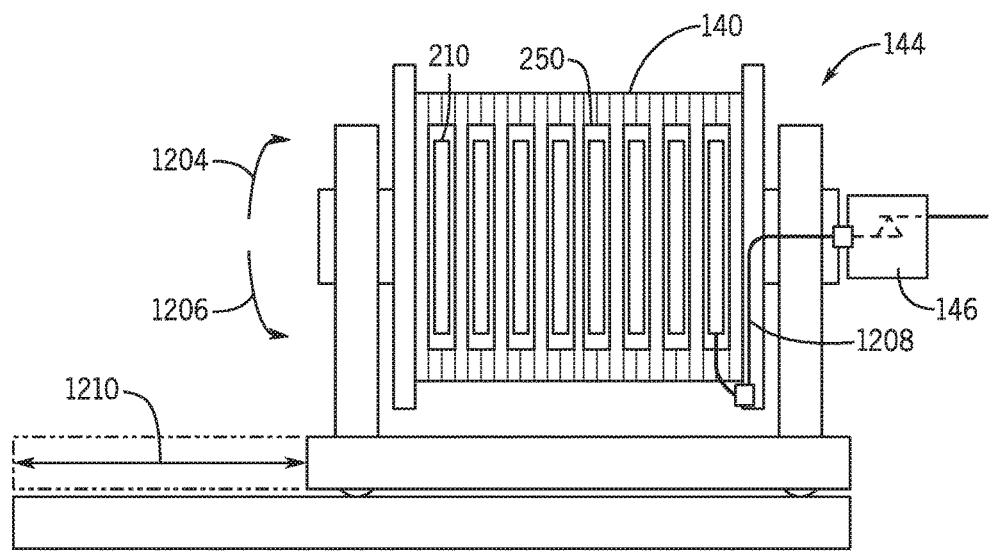
FIG. 12 is a schematic diagram of a drive unit and section reel used to deploy a receiver section according to an example implementation.

Referring to FIG. 12 in conjunction with FIG. 1, receivers 250 and a concentrator 210 for a given receiver section 220 are stored on a given section reel 140, which is installed on a drive unit 144. The concentrator 210 for this receiver section 220 is unconnected and is stored on a mounter 1310 (see FIG. 13A). Other mounters 1310 (see, for example, FIG. 13A) hold the receivers 250. The uppermost, or top receiver 250-1 for the receiver section 220 is connected to the hybrid slip ring 146 (belonging to the drive unit 144). A hybrid jumper cable 1208 belonging to the slip ring 146 may be used to make this connection.

The drive unit 144, which has motors, is capable of driving the section reel 140 in both directions (as depicted by rotational directions 1204 and 1206 in FIG. 12), depending on whether the scalable borehole acquisition system is being run into the well or being retrieved from the well. The speed of the rotation is controlled to be in synchronized with the speed of the de-tensioner 134. The control system for performing this functionality is not depicted in the figures. The drive unit 144 further includes a shifter, which moves the reel 140 sideways while the section reel 140 is rotating. This shifting eliminates problems caused by the "fleet angle."

Figure 13A:
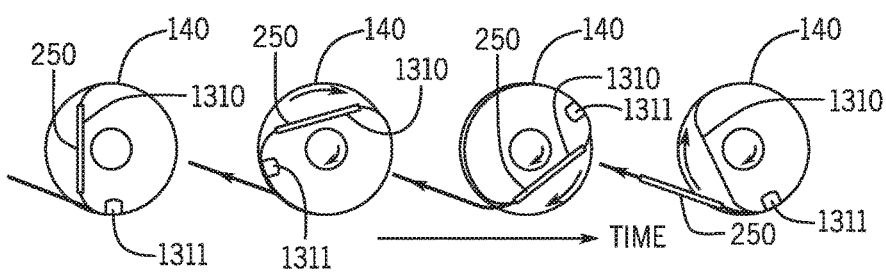
FIG. 13A illustrates motions of the section reel of FIG. 12 during an operation to deploy the scalable borehole acquisition system in the well according to an example implementation.

Referring to FIG. 13A, when the scalable borehole acquisition system 120 is run into the well, the receivers 250 and the concentrator 210 of the section reel 140 are automatically pulled out from mounters 1310 of the section reel 140. In accordance with example implementations, the mounters 1310 are not driven (rotated) by the motor of the drive unit 144 and instead are "free" elements.

Figure 13B:
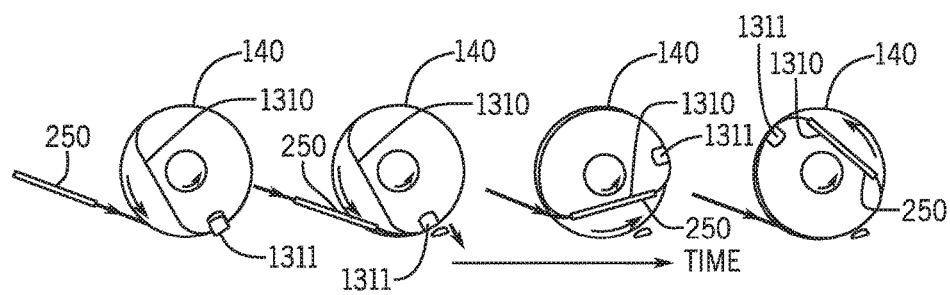
FIG. 13B illustrates operation of the section reel of FIG. 12 during an operation to retrieve the scalable borehole acquisition system from the well according to an example implementation.

Referring to FIG. 13B, when the scalable borehole acquisition system 120 is being retrieved from the well, the mounters 1310 are waiting for the receivers 250 and the concentrator 210 arrivals at a waiting position. When a given receiver/concentrator has just arrived/mounted on a given mounter 1310, the mounter 1310 may automatically spool the receiver/concentrator in. In other words, in accordance with example implementations, the mounters 1310 rotate by the arrival of the receivers 250 and the concentrator 210. A stopper 1311 releases the mounter 1310. This means that the mounters 1310 may react to the cable length change due to potential stretching or shrinkage of the cable.

Figure 14A:
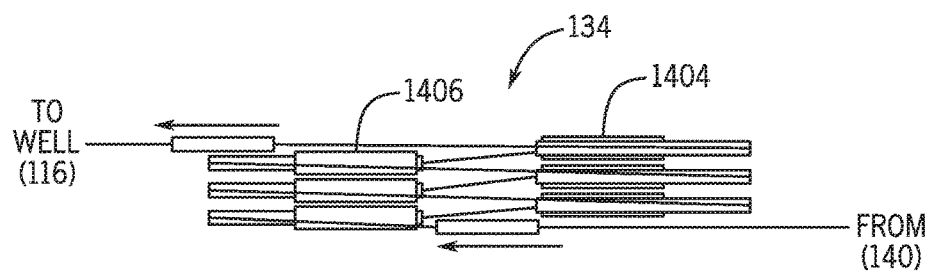
FIG. 14A is a top view of active sheaves of the surface system of FIG. 10 according to an example implementation.
Figure 14B:
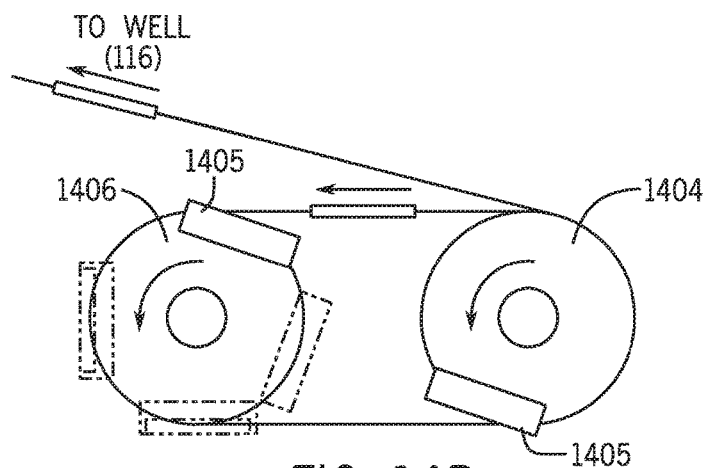
FIG. 14B is a side view of the active sheaves of FIG. 10 according to an example implementation.

Referring to FIGS. 14A and 14B (depicting respective top and side views of the de-tensioner 134), in accordance with example implementations, the de-tensioner is a capstan-type de-tensioner, as opposed to, for example, belt-sandwiched drive-type de-tensioner.

In general, each sheave 1404, 1406 of the de-tensioner has a free mounter 1405, which can mount/rotate the receivers 250 and concentrator 210 as the receiver/concentrator comes in when the scalable borehole acquisition system 120 is being retrieved from the well. The mounters 1405 are automatically positioned during waiting for the next unit arrival. It is noted that FIGS. 14A and 14B show the run-in-hole motion of the sheaves 1404 and 1406. The motion directions and waiting positions of the mounters 1405 are changed when the scalable borehole acquisition system 120 is being retrieved from the well. As described further below, after the top concentrator 210-1 has passed the de-tensioner 134, the long range telemetry cable 201 is sent to the well by the de-tensioner 134 during the deployment of the system 120. In this case, the mounters 1405 stay at their waiting positions.

Referring back to FIG. 1, in accordance with example implementations, a dual wheel spooler 130 of the surface system is used to monitor the downhole depth of the scalable borehole acquisition system 120. The spooler 130 is a precision device that measures the length of the cable assembly that passes through it. This surface measurement, when corrected for cable tension, temperature and other effects applied in an appropriate procedure, provides a measure of downhole depth along the borehole. It is noted that the surface system depicted in FIG. 1 and described herein, guides the cable and assembly under tension, in accordance with example implementations. It is noted that in accordance with some example implementations, the dual wheel spooler 130 contains passive sheaves that are formed from relatively small free rollers. The small rollers prevent the over-bending of cable; and the receivers 250 and the concentrator 210 may be held in between the rollers. It is noted that the spooler 130 may have further features not illustrated in figures, such as, for example, hangers to hold the sheaves.

Figure 15A:
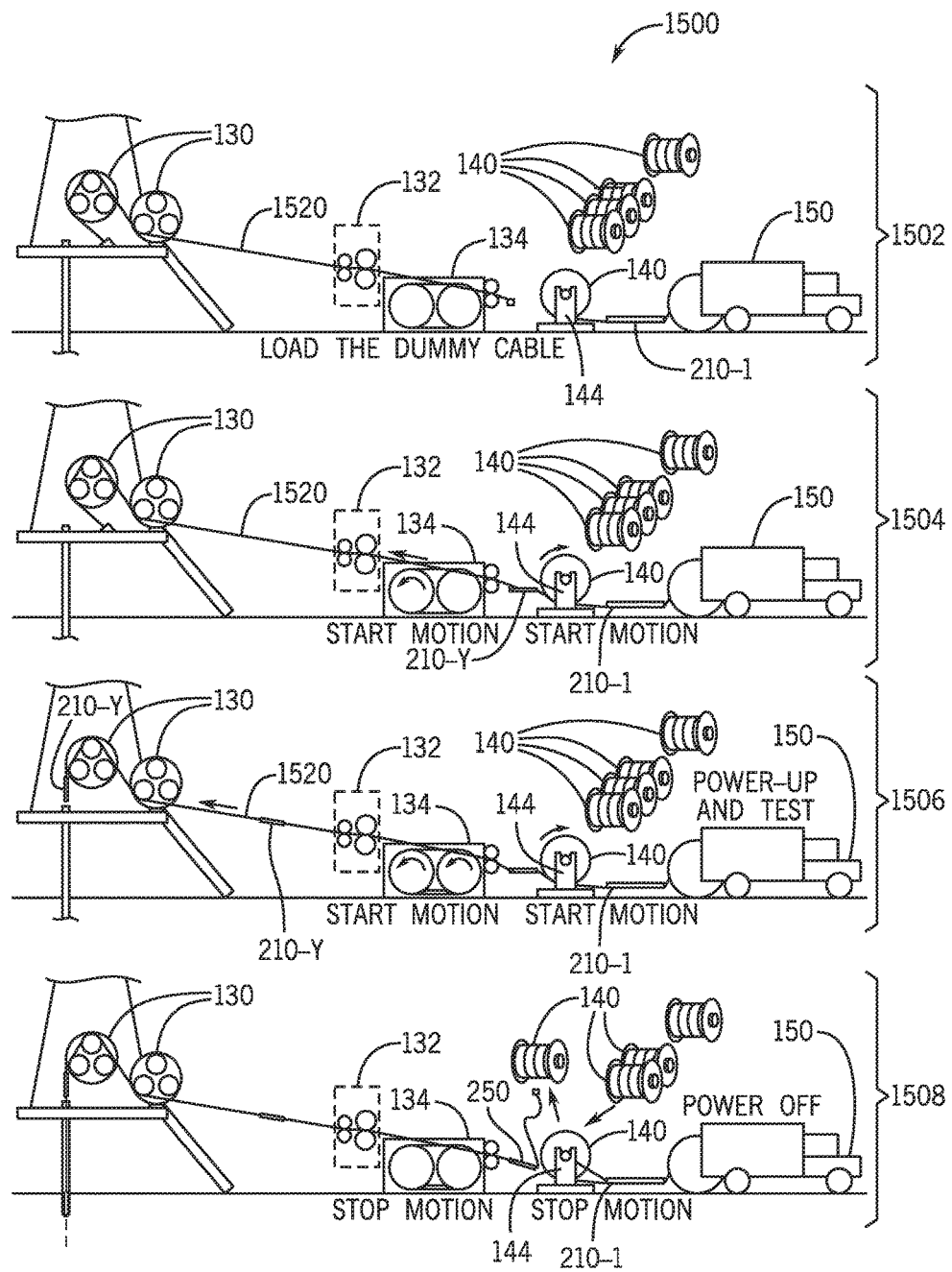
FIGS. 15A and 15B illustrate stages of a process to deploy the scalable borehole acquisition system in a well according to an example implementation.
Figure 15B:
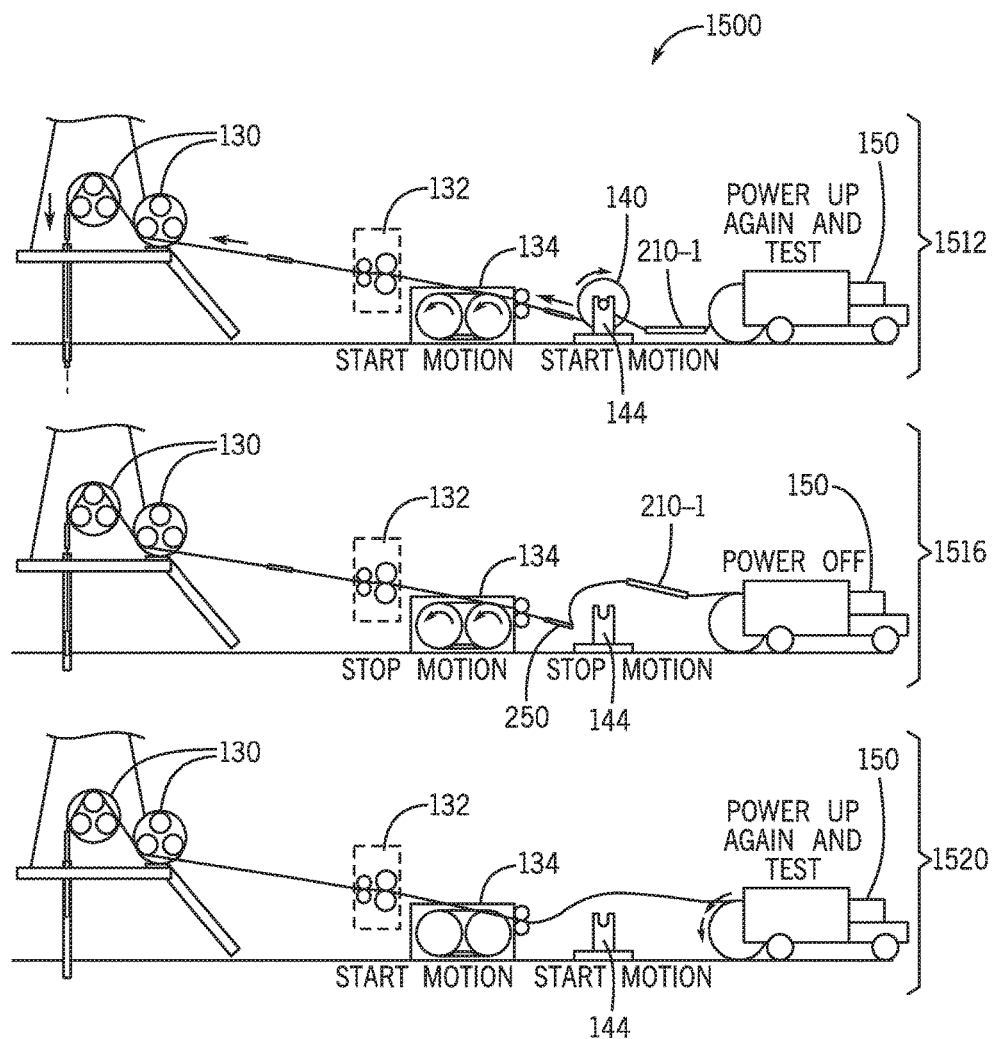

An example workflow 1500 for deploying the scalable borehole acquisition system 120 into the well is depicted in FIGS. 15A and 15B. Referring to FIG. 15A, in a first stage 1502, a dummy guide cable 1520 is sent through the de-tensioner 132 and is held stationary at the rig side. In the next step, the bottommost concentrator 210-Y residing on the first section reel 140 is connected to the dummy guide cable 1520 between the de-tensioner 132 and the section reel 140, as depicted in stage 1504. When the running-in-hole begins, the de-tensioner 132 starts loading the dummy cable 1520 and the bottom concentrator 210-4; and the drive unit 144 begins rotating and shifting simultaneously in synchronization with the de-tensioner 132.

The deployment then proceeds to stage 1506. When the first concentrator 210-Y (i.e., the bottommost concentrator 210) arrives at the wellhead, the dummy cable 1520 is disconnected. Then, the de-tensioner 134 begins loading the receivers 250 one by one. As noted earlier, the motors driving the de-tensioner and the drive unit 144 are synchronized in terms of speed continuously. Having the top concentrator 210-Y connected to the surface system through the temporary hybrid cable 1507 from the very beginning of the deployment allows testing of the system from this point on. Thus, the surface system may provide power to the scalable borehole acquisition system 120 and exchange data with the system 120 during the deployment of the system 120, in accordance with example implementations.

The above-described process continues until the last receiver 250 in the first reel 140 begins leaving the section reel 140. At this point, the system is stopped as illustrated in stage 1508. At the same time, the receiver section 220 that has been lowered into the well is powered off from the surface system. At this point, the first section reel 140 is replaced with a new one. For purposes of accomplishing this, the jumper cable 1208 (see FIG. 12) from the slip ring of the drive unit 144 is disconnected from the last receiver, leaving the last receiver disconnected, as depicted in stage 1508. The empty section reel 140 may be removed by a crane and replaced with a pre-loaded section reel 140.

Referring to FIG. 15B, in stage 1512, two new connections are made and motion begins once again. The bottom receiver 230 of the new reel 140 is connected to the slip ring of the drive unit 144 through the jumper cable 1208; and the unconnected receiver 250 from the previous section reel 140 is connected to the bottom concentrator 210 of the new reel 140. After making these connections, the motion in the system begins again, and the whole assembly is powered on from the surface system. While lowering the new receiver section 220 into the well, the entire system may be tested by exchanging data initiated from the surface system.

The process of changing the section reels 140 continues until the last section reel 140 is reached. At this point, the system is stopped again, as depicted in stage 1516. At the same time, the receiver section 220 that has been lowered into the well is powered off from the surface system. The last receiver of the last section reel 140 is disconnected from the slip ring of the drive unit 142 by disconnecting the jumper cable 1208; and the temporary hybrid cable between the top concentrator 210 and the drive unit 144 is also removed. Also, the last section reel 140 is removed from the drive unit 144 with a crane operation, in accordance with example implementations. At this point, the top concentrator 210-1 is connected to the last receiver 250 of the last section reel 140 through a cable of the last receiver section 220.

At this point, the long range telemetry cable reel 152, previously stationary, is used to lower the long range telemetry cable into the well, as depicted in stage 1520. Thus, the long rang telemetry reel 152 begins rotating (in synchronization with the de-tensioner 134) to lower the last components of the system (i.e. the top concentrator 210-1 and the long range telemetry cable) inside the well.

At this point, the surface system may power up and begin testing the entire scalable borehole acquisition system 120 continuously again until the system 120 reaches the desired depth. When this happens, the seismic acquisition process may begin, and the receivers 250 begin acquiring measurement data and forwarding the data to the surface system. Moreover, the surface system may begin communicating commands downhole to the scalable borehole acquisition system 120.

It is noted that the operations to retrieve the scalable borehole acquisition system 120 may generally proceed in a reverse order to the stages 1502-1520 that are depicted in FIGS. 15A and 15B.

Figure 16A:
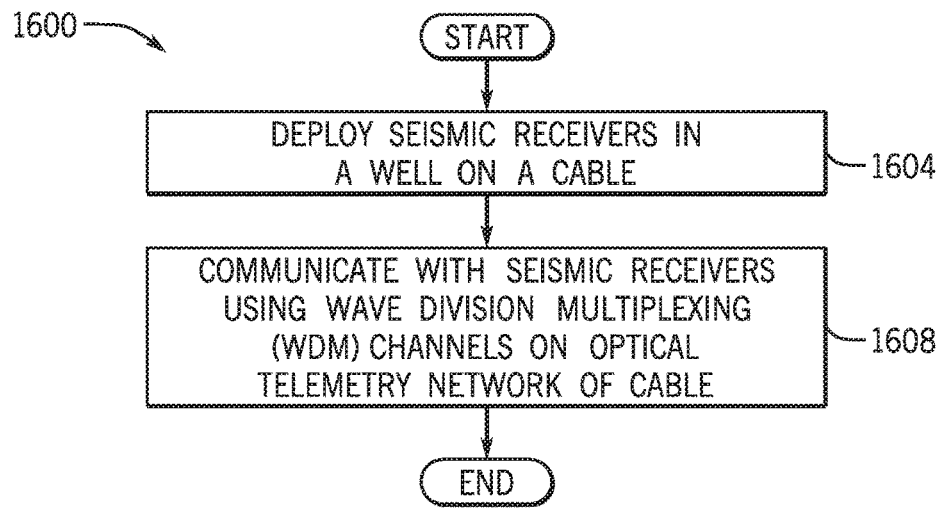
FIGS. 16A and 16B are flow diagrams depicting techniques to use wave division multiplexing (WDM) channels on an optical telemetry network to communicate with seismic receivers that are deployed in a well according to example implementations.

Thus, the scalable seismic borehole acquisition system is one example of a downhole system that uses WDM-based communication over an optical telemetry network. Therefore, referring to FIG. 16A, in accordance with example implementations, a technique 1600 includes deploying (block 1604) receivers in a well on a cable and communicating with the receivers using wave division multiplexing (WDM) channels on an optical telemetry network of the cable, pursuant to block 1608.

Figure 16B:
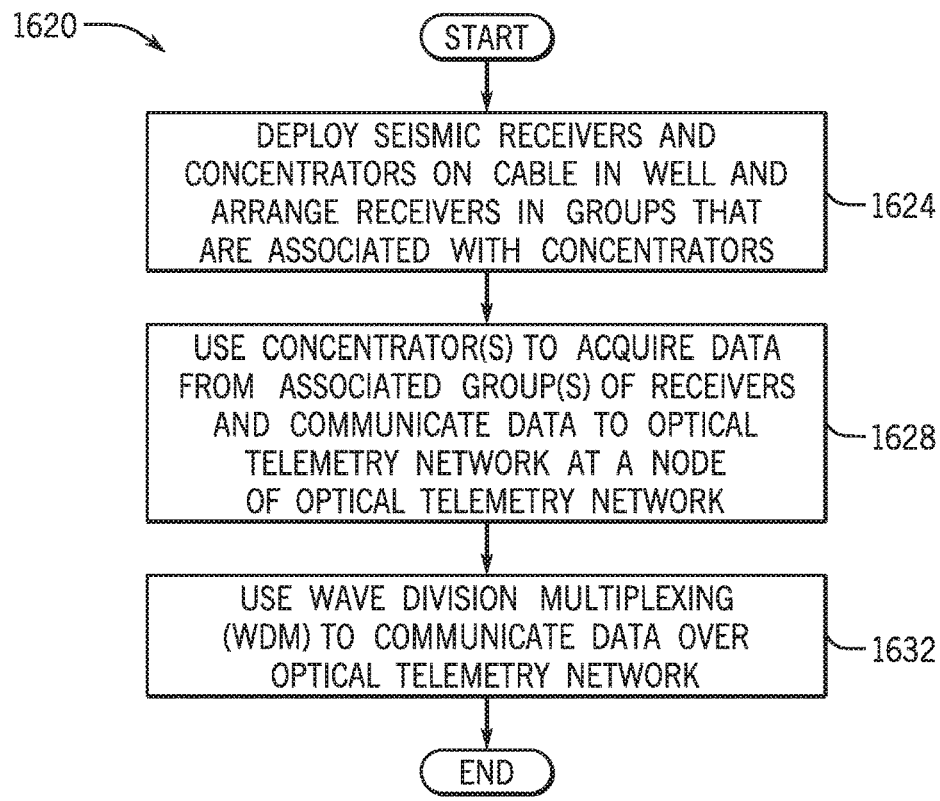

More specifically, in accordance with some implementations, a technique 1620 that is depicted in FIG. 16B may be used for purposes of communicating with seismic receivers in a scalable seismic borehole acquisition system. Pursuant to the technique 1620, seismic receivers are deployed (block 1624) in a well and arranged in groups; and concentrators are also deployed (block 1624) in the well on the cable with the receivers. Each concentrator acquires data from an associated group of receivers and introduces data to an optical telemetry network at a node of the optical telemetry network. Wave division multiplexing is used (block 1632) to communicate data over the optical telemetry network.

Figure 17:
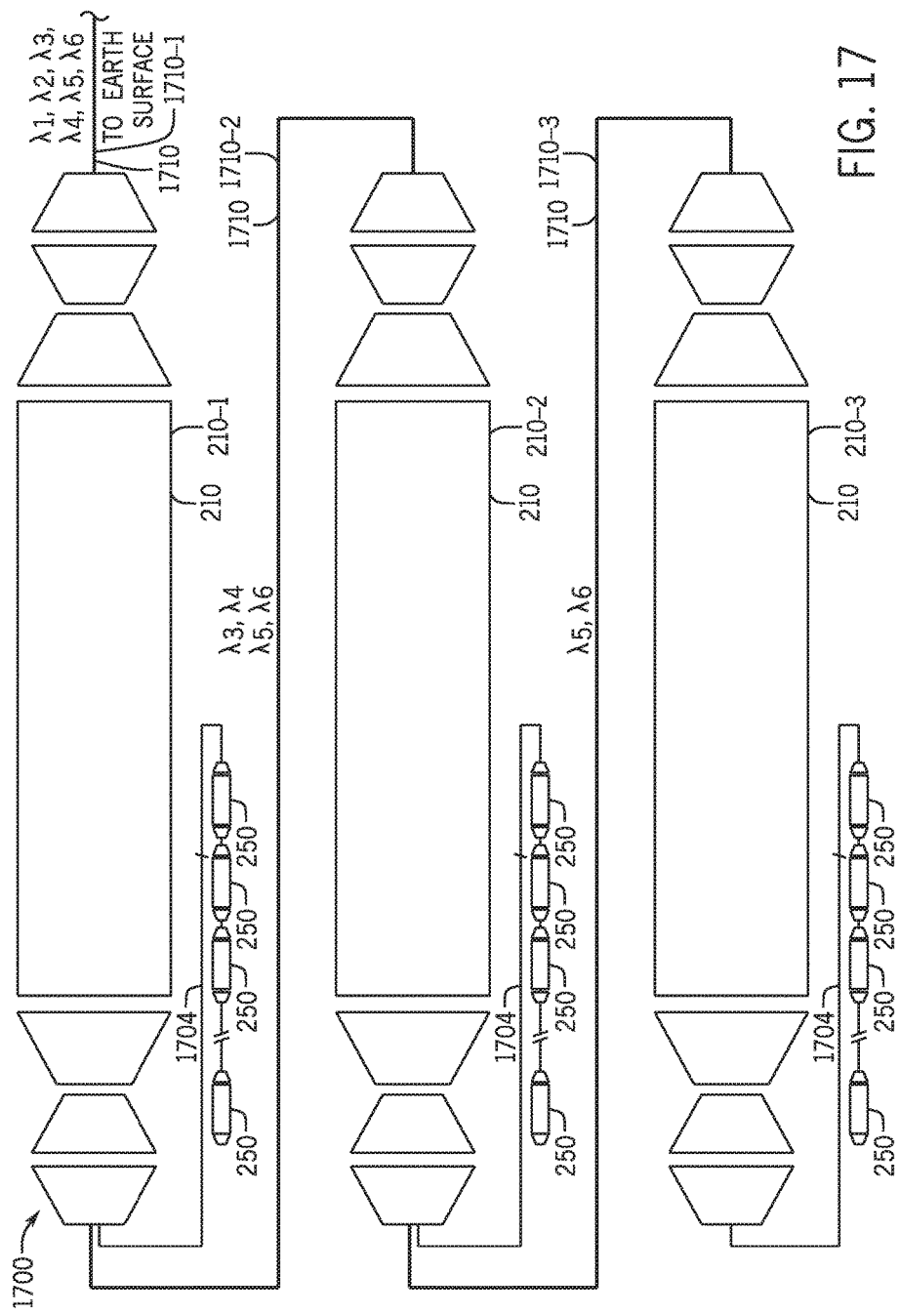
FIG. 17 is a schematic diagram illustrating the use of WDM channels for three concentrators according to an example implementation.

FIG. 17 is an illustration 1700 of WDM channel communication for an example downhole system of three concentrators 210 (concentrators 210-1, 210-2 and 210-3, being depicted in FIG. 17) and three associated groups of seismic receivers 250. It is noted that although FIG. 17 depicts three concentrators 210, WDM channel-based communication may be used with more or fewer than three concentrators 210, in accordance with further example implementations.

FIG. 17 further depicts three segments 1710 of the optical telemetry network: segment 1710-1 that extends from the uppermost concentrator 210-1 to the Earth surface; segment 1710-2 that extends between the uppermost concentrator 210-1 and the middle concentrator 210-2; and segment 1710-3 that extends between the middle concentrator 210-2 and the lowermost concentrator 210-3.

For the example implementation of FIG. 17, six carrier wavelengths $\lambda$ (i.e., six corresponding optical carrier frequencies) are used for the respective WDM channels and are labeled as: $\lambda 1$, $\lambda 2$, $\lambda 3$, $\lambda 4$, $\lambda 5$ and $\lambda 6$. WDM channels corresponding to all six wavelengths $\lambda 1$, $\lambda 2$, $\lambda 3$, $\lambda 4$, $\lambda 5$ and $\lambda 6$ are used to bi-directionally communicate data for all three concentrators 210-1, 210-2 and 210-3 over the optical telemetry network segment 1710-1 that extends between the uppermost concentrator 210-1 and the Earth surface. In particular, for this example, the WDM channels corresponding to wavelengths $\lambda 1$ and $\lambda 2$ are assigned to the concentrator 210-1: the concentrator 210-1 communicates the data acquired by its associated receivers 250 to the Earth surface by using transmissions over the $\lambda 1$ channel; and the concentrator 210-1 receives commands for its associated receivers 250 from the Earth surface over the $\lambda 2$ channel. The other wavelengths $\lambda 3$, $\lambda 4$, $\lambda 5$ and $\lambda 6$ pass through the uppermost concentrator 210-1 to the concentrators 210-2 and 210-3 that are disposed below the uppermost concentrator 210-1.

The optical segment 1710-2 between the uppermost concentrator 210-1 and the middle concentrator 210-2 communicates the $\lambda 3$, $\lambda 4$, $\lambda 5$ and $\lambda 6$ channels. For this example, the concentrator 210-2 is assigned the $\lambda 3$ channel to transmit acquired data uphole to the Earth surface; and the concentrator 210-2 receives commands communicated from the surface using the $\lambda 4$ channel. The $\lambda 5$ and $\lambda 6$ channels pass through the concentrator 210-2 to the lowermost concentrator 210-3. The concentrator 210-3 uses the $\lambda 5$ channel to transmit acquired data to the Earth surface and uses the $\lambda 6$ channel to receive commands from the Earth surface.

As can be appreciated from FIG. 17, additional WDM channels may be used for implementations in which more than three concentrators 210 (and associated receiver sections 220) are used. The number of channels is twice the number of concentrators 210 (i.e., two WDM channels per concentrator 210), in accordance with example implementations.

Figure 18:
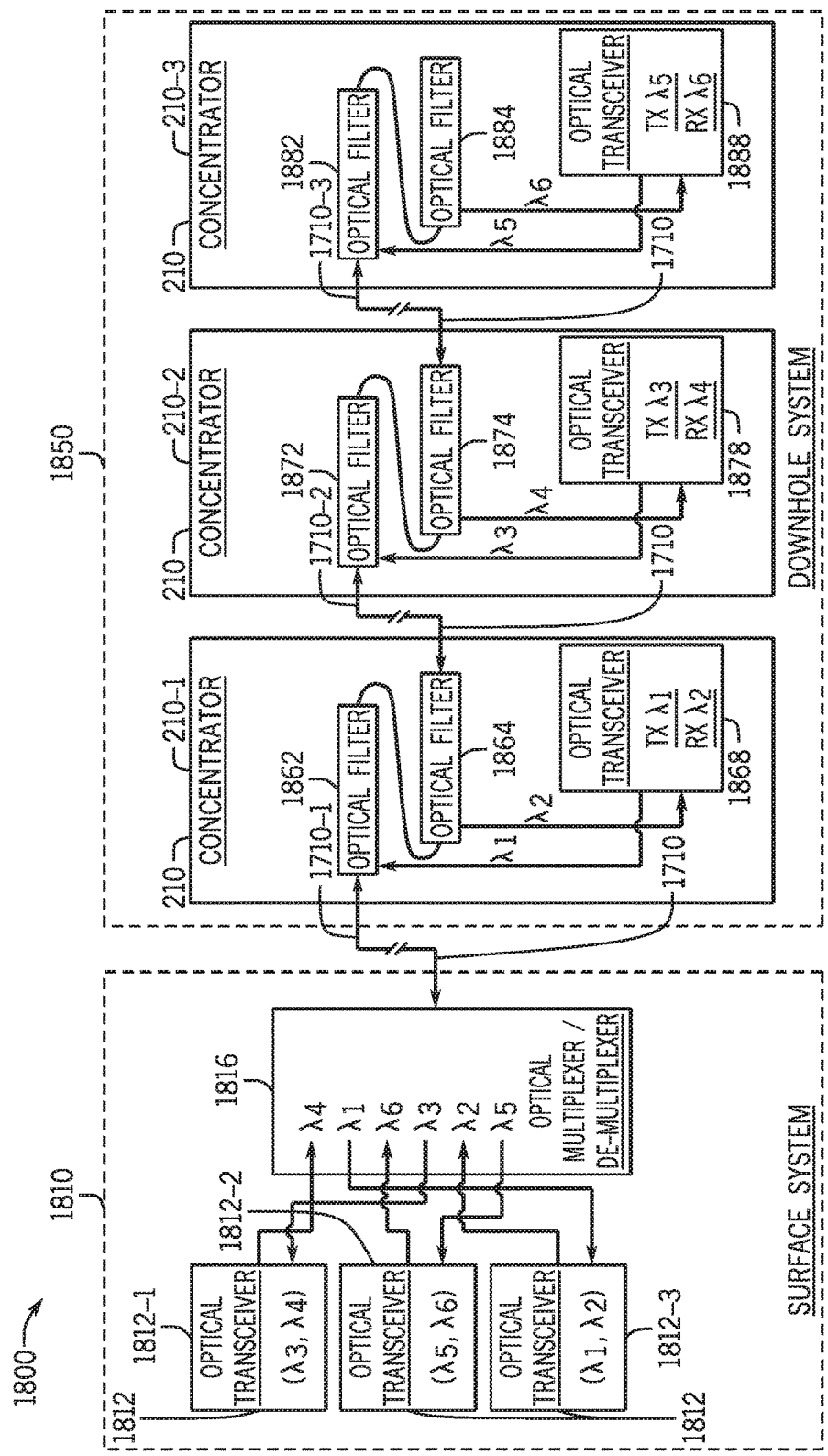
FIG. 18 is a more detailed schematic diagram illustrating components of surface equipment and components of the concentrators of FIG. 17 according to an example implementation.

FIG. 18 is an illustration 1800 of a specific example implementation of a surface system 1810 and a downhole system 1850 that has three concentrators 210-1, 210-2 and 210-3 and uses WDM channel-based communication. For this example, the surface system 1810 includes optical transceivers 1812 for purposes of communicating with the concentrators 210 over the WDM channels. In particular, the surface system 1810 includes an optical transceiver 1812-1 that communicates with the concentrator 210-2 using the $\lambda 3$ and $\lambda 4$ wavelengths; an optical transceiver 1812-2 that communicates with the concentrator 210-3 using the $\lambda 5$ and $\lambda 6$ wavelengths; and an optical transceiver 1812-3 that communicates with the concentrator 210-1 using the $\lambda 1$ and $\lambda 2$ wavelengths. An optical multiplexer/demultiplexer 1816 of the surface equipment 1810 multiplexes/demultiplexes the WDM channels between the optical segment 1710-1 and the transceivers 1812.

For the downhole system 1850, each concentrator 210 for this example implementation includes optical filters to selectively add and drop the appropriate WDM channels that are used by the concentrator 210. A given optical filter is constructed to perform selective optical reflection, transmission and blocking for purposes of adding or dropping optical energy that corresponds to a given WDM channel. As depicted in FIG. 18, each concentrator 210 includes two optical filters that are serially coupled together inline with the optical segments 1710: one of the filters receives optical energy for a given WDM channel to add the channel to the optical telemetry network; and the other optical filter removes optical energy corresponding to another given WDM channel to remove the channel from the optical telemetry network.

More specifically, the concentrator 210-1 has an optical filter 1862 that adds the $\lambda 1$ channel and an optical filter 1864 that drops, or removes, the $\lambda 2$ channel. An optical transceiver 1868 of the concentrator 210-1 forms a bridge for communicating between the $\lambda 1$ and $\lambda 2$ and the associated group of receivers 250.

The concentrator 210-2 includes an optical filter 1872 for adding the $\lambda 3$ channel; an optical filter 1874 for dropping the $\lambda 4$ channel; and an optical transceiver 1878. $L_1$ likewise, the concentrator 210-3 has an optical filter 1882 for adding the $\lambda 5$ channel; an optical filter 1884 for dropping the $\lambda 6$ channel; and an optical transceiver 1888.

Figure 19:
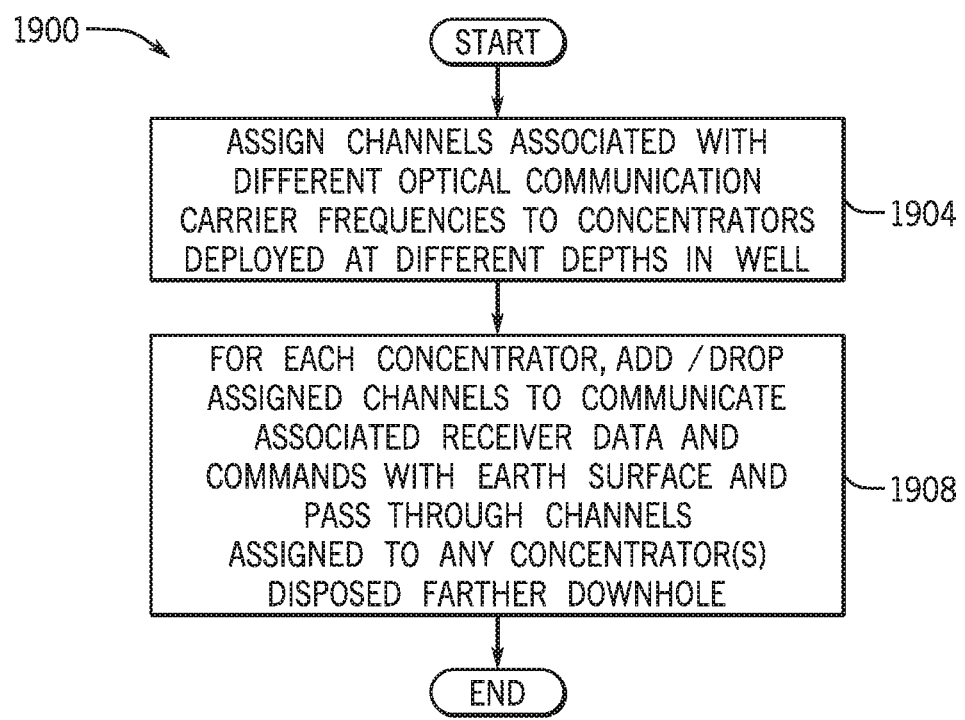
FIG. 19 is a flow diagram depicting the use of a WDM channel-based well communication system according to an example implementation.

Referring to FIG. 19, thus, in accordance with example implementations, a technique 1900 includes assigning (block 1904) channels with different optical communication carrier frequencies to concentrators that are deployed at different depths in a well. The technique 1900 includes for each concentrator, adding/dropping assigned channels to/from an optical telemetry network to communicate associated receiver data and commands with the surface and pass through channels that are assigned to any concentrator(s) disposed farther downhole.

In accordance with example systems and techniques that are disclosed herein, coarse wave division multiplexing (CWDM) is used for the optical telemetry network. For example, the wavelengths may be in a range that extends from 1270 nanometers (nm) to 1610 nm; and a channel spacing of 20 nm may be used. A given concentrator 210 (and thus, an associated receiver section 220) uses an associated wavelength channel for receiving downlink data (such as command data) and an associated wavelength channel for transmitting uplink data (acquired measurement data, for example) to the Earth surface.

In accordance with example implementations, the following wavelengths ($\lambda$s) for the command and data may be described as follows:

Wavelengths for command data: $\lambda i1, \lambda i2, \lambda i3, \ldots \lambda im$, Eq. 1 where "i" denotes wavelengths used for the communication of command data; and "m" represents a given concentrator index.

Wavelengths for measurement data=$\lambda j1, \lambda j2, \lambda j3, \ldots \lambda jn$, Eq. 2 where "j" denotes a wavelength used for measurement data communication; and "n" represents the given concentrator index.

In accordance with example implementations, the $\lambda 1, \lambda 2, \lambda 3, \lambda 4, \lambda 5$ and $\lambda 6$ wavelengths for the example implementation that is depicted in FIGS. 17 and 18 and described above may be 1510 nm, 1530 nm, 1550 nm, 1570 nm, 1590 nm and 1610 nm, respectively. Other wavelengths, more wavelengths and fewer wavelengths may be used, depending on the particular implementation.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method usable with a well, the method comprising:
   deploying tools in the well;
   communicating, using a non-optical telemetry network, data between the tools and a concentrator;
   communicating, using an optical telemetry network, the data between the concentrator and an Earth surface system using wave division multiplexing (WDM) channel-based communication; and
   processing, via the Earth surface system, the data for at least one of imaging or determining seismic characteristics of a geologic structure surveyed via the well.

2. The method of claim 1, wherein:
   deploying the tools comprises deploying seismic receivers in the well; and
   using WDM channel-based communication comprises using WDM channel-based communication to at least communicate data acquired by the seismic receivers for uphole communication to the Earth surface system.

3. The method of claim 1, wherein deploying the tools comprises deploying the tools on a cable.

4. The method of claim 1, wherein deploying the tools comprises deploying at least one of the following:
   a resistivity sensor;
   a fluid sampler;
   a nuclear magnetic resonance (NMR) receiver;
   a particle motion receiver;
   a pressure receiver;
   a strain sensor;
   a formation sampler;
   an electromagnetic (EM) receiver; and
   a microelectromechanical system (MEMS) receiver.

5. The method of claim 1, further comprising:
   arranging the tools in groups; and
   wherein using WDM channel-based communication comprises assigning at least one WDM channel for Earth surface communication to each group.

6. The method of claim 5, wherein assigning the at least one channel to each group of tools comprises assigning a first WDM channel for uphole communication and assigning a second WDM channel for downhole communication.

7. The method of claim 5, wherein each of the groups is communicatively coupled to a respective concentrator, each concentrator is to serve as a node to the optical telemetry network, the concentrators are disposed at distances in the well, the method further comprising:
   for at least one of the concentrators, using at least one WDM channel for communicating with the optical telemetry network and passing at least another WDM channel through the concentrator to another concentrator disposed downhole.

8. The method of claim 1, wherein the concentrator includes a first concentrator and a second concentrator, wherein the tools includes a first group of tools and a second group of tools, and wherein the non-optical network includes a first dedicated non-optical network and a second dedicated non-optical network, the method further including:
   communicatively coupling the first group of tools to the first concentrator via the first dedicated non-optical network;
   communicatively coupling the second group of tools to the second concentrator via the second dedicated non-optical network;
   communicatively coupling the first concentrator and the second concentrator to the Earth surface system via the optical network; and
   using the first concentrator and the second concentrator to communicate data between respective ones of the first group of tools and the second group of tools and the surface system using the wave division multiplexing (WDM) channels of the optical network.

9. The method of claim 8, further including using the first concentrator as a first node of the optical network and using the second concentrator as a second node of the optical network.

10. The method of claim 8, further including assigning each of the first concentrator and the second concentrator a first WDM channel or carrier wavelength for communicating downlink data that originates from a surface system.

11. The method of claim 10, further including assigning each of the first concentrator and the second concentrator a second WDM channel or carrier wavelength for communicating acquired data originating with the respective ones of the first group of tools and the second group of tools to the surface system.

12. The method of claim 8, further including:
receiving, via the first concentrator, data from the first group of tools;
converting the data from the first group of tools to uplink data; and
modulating, via the first concentrator, an assigned carrier wavelength with the uplink data to communicate the uplink data to the surface system via the optical network.

13. The methods of claim 8, further including:
receiving, via the first concentrator, downlink data from the surface system via the optical network; and
demodulating, via the first concentrator, optical energy of the downlink data to communicate the downlink data to the first group of tools.

14. The methods of claim 8, wherein the optical network is a high-speed telemetry network and the non-optical network is slow-speed telemetry network such that the optical network is to operate at a relatively higher clock frequency than the non-optical network.

15. The method of claim 1, further including communicating commands to the tools from the Earth surface system by:
communicating the commands from the Earth surface to the concentrator using the optical telemetry network; and
communicating the commands from the concentrator to the tools using the non-optical telemetry network.

* * * * *